US008644000B2

(12) United States Patent
Dogan et al.

(10) Patent No.: US 8,644,000 B2
(45) Date of Patent: Feb. 4, 2014

(54) NANOSTRUCTURED DIELECTRIC MATERIALS FOR HIGH ENERGY DENSITY MULTILAYER CERAMIC CAPACITORS

(76) Inventors: Fatih Dogan, Rolla, MO (US); Alan Devoe, La Jolla, CA (US); Ian Burn, Hockessin, DE (US)

(*) Notice: Subject to any disclaimer, the term of this patent is extended or adjusted under 35 U.S.C. 154(b) by 213 days.

(21) Appl. No.: 13/230,926

(22) Filed: Sep. 13, 2011

(65) Prior Publication Data

US 2013/0063858 A1    Mar. 14, 2013

(51) Int. Cl.
*H01G 4/30* (2006.01)
(52) U.S. Cl.
USPC ............ 361/301.4; 361/301.2; 361/311; 361/313; 361/321.1; 361/306.1
(58) Field of Classification Search
USPC ........... 361/301.4, 301.2, 303–305, 311–313, 361/321.1, 321.2, 306.1, 306.3
See application file for complete search history.

(56) References Cited

U.S. PATENT DOCUMENTS

| | | | | |
|---|---|---|---|---|
| 5,886,867 A | * | 3/1999 | Chivukula et al. | 361/311 |
| 6,541,375 B1 | * | 4/2003 | Hayashi et al. | 438/679 |
| 6,740,614 B2 | * | 5/2004 | Kim et al. | 501/139 |
| 7,271,434 B2 | * | 9/2007 | Kellar et al. | 257/309 |
| 7,378,363 B2 | * | 5/2008 | Zheng et al. | 501/136 |
| 8,064,190 B2 | * | 11/2011 | Taniguchi | 361/321.4 |
| 2005/0239218 A1 | | 10/2005 | Aggarwal et al. | |
| 2011/0051315 A1 | | 3/2011 | Dogan | |

FOREIGN PATENT DOCUMENTS

EP    0408906    8/1995

* cited by examiner

*Primary Examiner* — Nguyen T Ha
(74) *Attorney, Agent, or Firm* — Brannon Sowers & Cracraft PC

(57) ABSTRACT

A multilayer ceramic capacitor, having a plurality of electrode layers and a plurality of substantially titanium dioxide dielectric layers, wherein each respective titanium dioxide dielectric layer is substantially free of porosity, wherein each respective substantially titanium dioxide dielectric layer is positioned between two respective electrode layers, wherein each respective substantially titanium dioxide dielectric layer has an average grain size of between about 200 and about 400 nanometers, wherein each respective substantially titanium dioxide dielectric layer has maximum particle size of less than about 500 nanometers. Typically, each respective substantially titanium dioxide dielectric layer further includes at least one dopant selected from the group including P, V, Nb, Ta, Mo, W, and combinations thereof, and the included dopant is typically present in amounts of less than about 0.01 atomic percent.

21 Claims, 18 Drawing Sheets

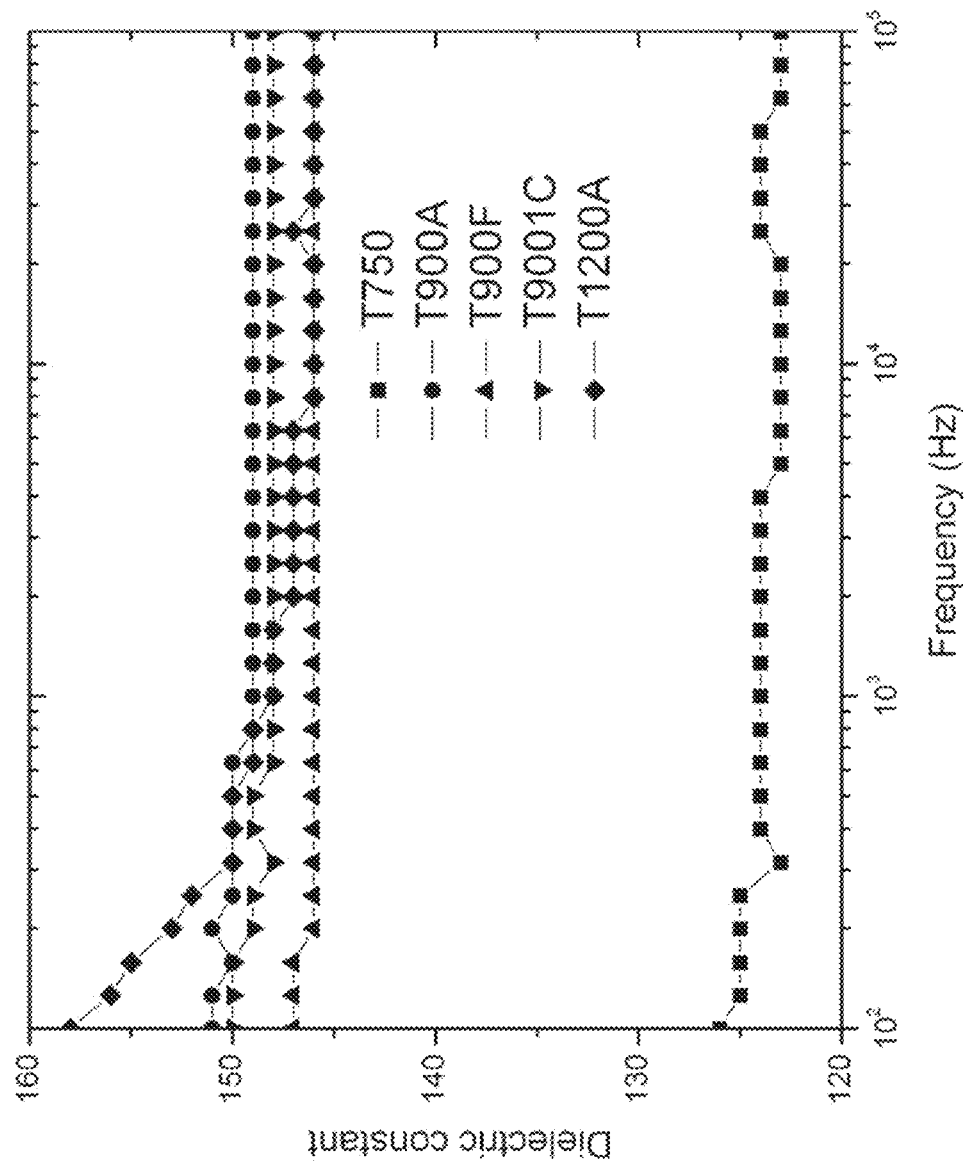

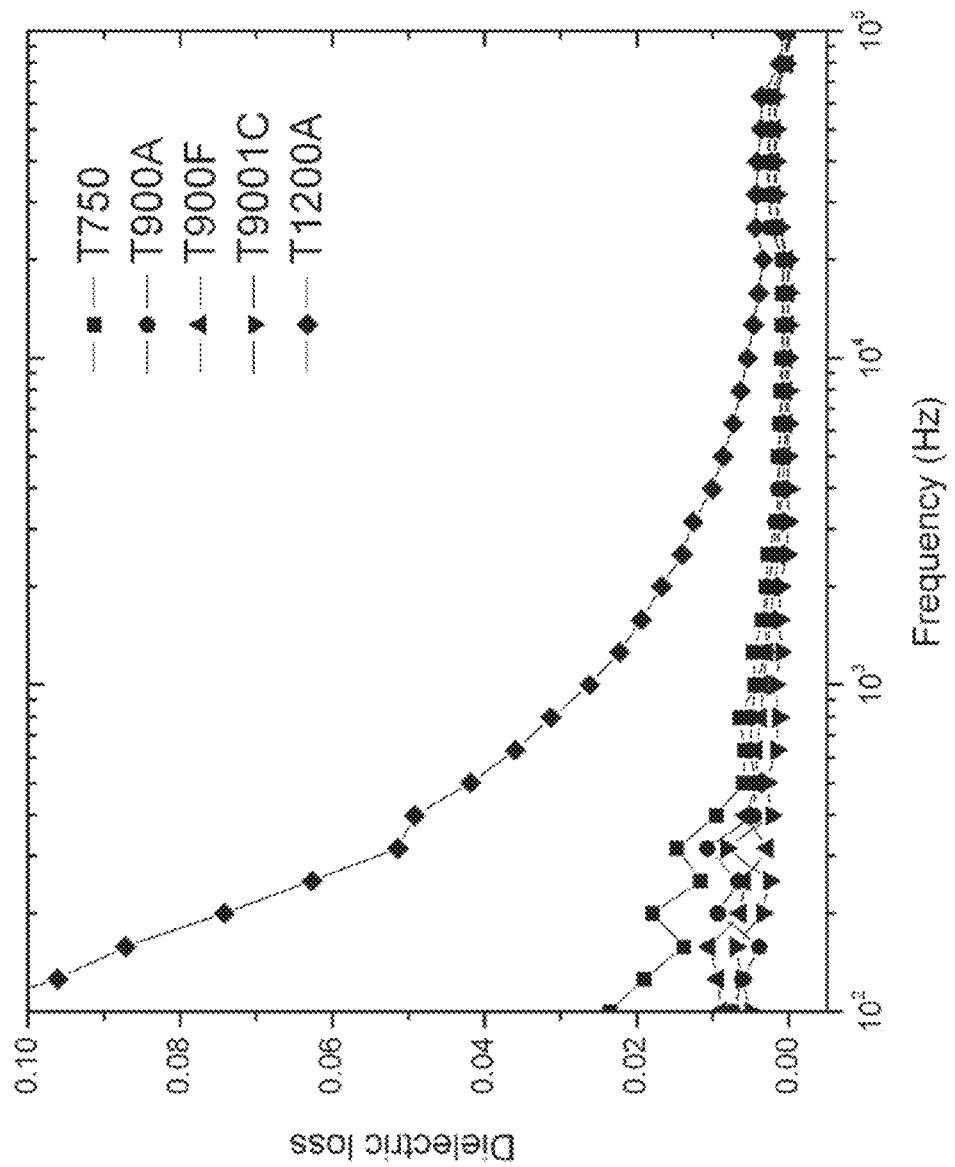

NANOSTRUCTURED DIELECTRIC MATERIALS FOR HIGH ENERGY DENSITY MULTILAYER CERAMIC CAPACITORS

GRANT STATEMENT

The invention was made in part from government support under Grant No. FA9451-08-C-0167 from the Office of the Air Force Material Command. The U.S. Government has certain rights in the invention.

CROSS-REFERENCE TO RELATED APPLICATIONS

This application claims priority to co-pending U.S. patent application Ser. No. 12/550,373, filed on Aug. 29, 2009, which claimed priority to then co-pending U.S. Provisional Patent Ser. No. 61/190,514, filed Aug. 29, 2008.

TECHNICAL FIELD

The present invention relates to the field of ceramic science and, more particularly high energy density multilayer ceramic capacitors.

BACKGROUND

There is an urgent demand for capacitors that can store high amounts of electrical energy for uses that include vehicles, off-peak power generation, fuel cells, space exploration, and military applications. The principles of energy storage in capacitors have been well understood for some time. The key parameters determining energy density are the following:

The permittivity (dielectric constant) of the dielectric and its dependence on applied DC voltage
The maximum field that the dielectric can sustain without breakdown, and
The packaging efficiency of the dielectric
The energy stored per unit volume of dielectric, J, is given by:

$$J = \int_0^{E_b} \varepsilon_0 \varepsilon_r(E) E \, dE \quad (1)$$

where $\varepsilon_0$ is the permittivity of free space, $\varepsilon_r(E)$ is the relative permittivity of the dielectric, E is the electrical field, and $E_b$ is the dielectric breakdown strength (the highest electric field that the dielectric material can withstand). If, and only if, the dielectric is linear, i.e. the polarization increases linearly with applied field, equation (1) can be simplified to $$J = \frac{1}{2}\varepsilon_0 \varepsilon_r E_b^2 \quad (2)$$

It is well known that the dielectric materials for these capacitors art typically chosen from materials characterized by a combination of high dielectric permittivity and high break-down strength. Unfortunately, materials with very high break-down strengths, such as polymers, tend to have low dielectric permittivity. Efforts to increase the permittivity by loading polymers with powders of high permittivity ceramics generally result in degraded break-down strength. Conversely, dielectrics with high permittivity such as those based on barium titanate usually have relatively low break-down strength and, moreover, the permittivity is often non-linear, being strongly suppressed by the application of high electric fields.

Early work on ceramic dielectrics indicated that a near linear dielectric based on strontium titanate with a permittivity of about 225 had lower energy storage capability than a high permittivity dielectric based on barium titanate, even when the dependence permittivity on field was taken into account. The same conclusion was reached when the energy storage capability of the strontium titanate dielectric was compared with anti-ferroelectric ceramic dielectrics based on lead zirconate.

However, recent research has indicated that energy storage in sintered pellets of titanium dioxide, a linear dielectric with a permittivity of about 125, can have high energy storage capacity (ca. 14J/cc) when the grain size is kept small (<500 nm) during sintering in an oxygen atmosphere, because breakdown voltages as high as 140V/μm can be achieved.

On the other hand, manufacturing multilayer ceramic capacitors using a titanium dioxide dielectric with fired grain size <500 nm presents numerous processing difficulties. Multilayer ceramic capacitors are usually constructed by casting and then drying a slurry of dielectric powder, organic binder and a solvent to form a flexible "green" tape. A metal paste, or ink, consisting of metal powder, an organic resin and a solvent, is applied to one side of the tape, usually by a screen printing process, and then layers of the metalized tape are stacked and laminated to form a monolithic body in which alternate metal layers respectively have a common polarity. This monolithic structure must be then fired to sinter the ceramic dielectric and bond the inner metal layers to the ceramic. In the case of capacitors containing titanium dioxide as a dielectric, problems can be expected when binder materials are removed from the ceramic and from the electrode layers because of the strong tendency of titanium dioxide to become semiconducting if the combusting organics lower the level of oxygen within the capacitor during processing. In addition, there can be chemically incompatibility between the dielectric material and the metal in the electrodes and mechanical incompatibility due to differences in shrinkage of the ceramic and metal layers during firing.

Thus, there remains a need for multilayer ceramic capacitors exhibiting both high dielectric permittivity and high breakdown strength, as well as for a way of fabricating the same. The invention addresses these needs.

BRIEF DESCRIPTION OF DRAWINGS

FIG. 7A is a plot illustrating the dielectric constants of the sintered bodies.

FIG. 7B is a plot illustrating the dielectric loss of the sintered bodies.

DETAILED DESCRIPTION OF INVENTION

Figure 1:
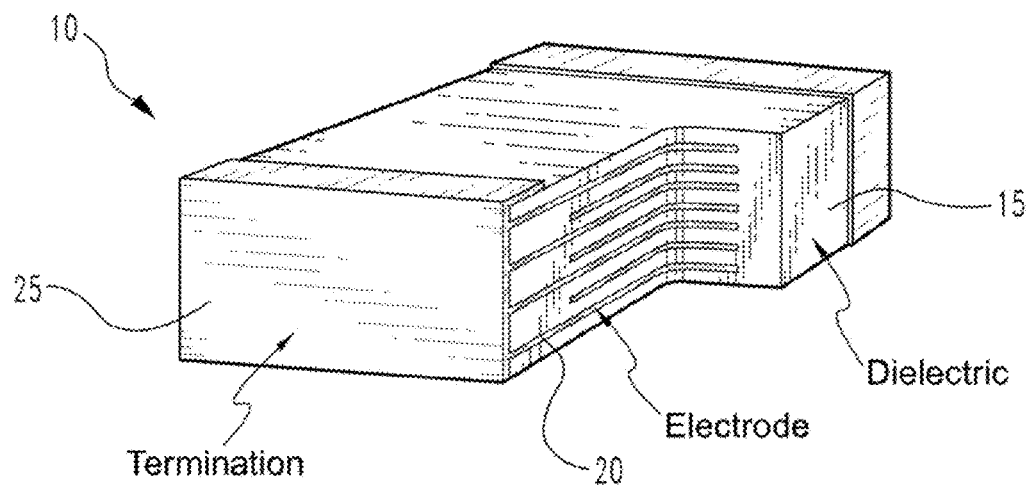
FIG. 1 is a schematic illustration of a multilayer capacitor according to a first embodiment of the present invention.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Titanium dioxide ($TiO_2$) is one of the most widely used ceramic materials, having a broad range of applications such as pigments, sensors, waste treatment, solar cells and capacitors. Nanocrystalline $TiO_2$ ceramics have been the subject of great interest to researchers over the years. Research has been conducted in such diverse areas as $TiO_2$ nanopowder synthesis, thin film fabrication, and the sintering of bulk ceramics. However, thus far pure $TiO_2$ nanopowder material has seldom been used as a dielectric material for capacitor applications as it can easily be reduced, leading to devices having lower resistivity and high dielectric loss, even though the intrinsic dielectric loss of stoichiometric $TiO_2$ is very low.

The properties of ceramics (both mechanical properties and electrical properties) heavily depend on their microstructural features, such as grain size, porosity, secondary phase and the like, and it is possible to enhance some desired properties by manipulating the microstructure of ceramics. The invention defines a new and improved nanostructured ceramic material with attractive dielectric properties, such as low intrinsic dielectric loss and high breakdown strength.

Generally there are two key parameters that will determine the energy density of dielectric materials: one is the dielectric constant and the other is dielectric breakdown strength (highest field the dielectric material can withstand). The volumetric energy density of dielectrics is determined by:

$$W = \int_0^{E_b} \varepsilon_0 \varepsilon_r(E) E dE \quad (3)$$

where W is volumetric energy density (J/cm³), $\varepsilon_0$ is the permittivity of free space, $\varepsilon_r$ is the relative permittivity of the dielectric material, E is the electrical field, and $E_b$ is the dielectric breakdown strength. For linear dielectric materials, equation (3) can be simplified to $$W = \frac{1}{2} \varepsilon_0 \varepsilon_r E_b^2 \quad (4)$$

which implies that the energy density is primarily a function of the dielectric breakdown strength.

According to a first embodiment, the novel nanostructured dielectric material is composed of at least one layer of nanostructured dielectric ceramic material. In other words, the ceramic material has a nano-scale grain size and no residual porosity. One exemplary material is titania ($TiO_2$). As grain size decreases from 10 μm to 200 nm, the breakdown strength of $TiO_2$ increases from about 550 KV/cm to about 1100 KV/cm. Referring to Eq. 2, nanostructured and dense $TiO_2$ having increased breakdown strength should be a good candidate material for high energy density capacitors. Other nanostructured and dense dielectrics materials including but not limited to $Al_2O_3$, stabilized $ZrO_2$, $BaTiO_3$, and PZT should also exhibit high electrical breakdown strength as compared to their conventional counterparts having a grain structure in micrometer range (>1 μm). Typical grain size and density limits for nanostructured dielectrics are less than about 300 nm and greater than about 99.9% of theoretical density (or less than about 0.1% porosity), respectively.

The present invention also provides a method for fabrication of the novel dielectric material, which typically includes at least one layer of nanostructured dielectric ceramic material. The inventive fabrication method generally comprises the steps of 1) compacting a pre-selected dielectric material powder into a pellet and 2) sintering the pellet in a substantially oxidizing atmosphere, such as pure oxygen, and at a predetermined temperature and for a predetermined length of time, such that the time/temperature profile is sufficient to sinter the dielectric material to substantially theoretical density without giving rise to undue grain growth and yielding a microstructure characterized by substantially uniform grain size.

The novel technology provides an exemplary fabrication of nanostructured $TiO_2$. Specifically, any commercially available nanosized $TiO_2$ powders (particle size <50 nm) may be selected as starting material for the inventive nanostructured $TiO_2$. In the compacting step, the powders may be compressed by any convenient method, such as uniaxially compacted in a die at about 50 MPa to obtain a pellet, may then be statically compacted at a pressure of about 300 MP; however, any convenient compaction method may be used to produce a green body pellet or substrate.

In the sintering step, the densification of the green body may be conducted at sufficient temperature, typically between about 750° C.-1200° C., in a sufficiently oxidizing atmosphere, such as pure oxygen at ambient pressure or flowing air, and with a sufficiently slow cooling profile (such as furnace cooling or a cooling rate of about 1° C./min or less). Sintering in an oxidizing atmosphere and cooling at slow rates (less than about 1° C./min) facilitate oxidation (or at least retard reduction) of the oxide dielectric material (in this example, $TiO_2$), which results in more uniform and thus improved dielectric properties of the material. During the oxygenation process, the number of oxygen vacancies in $TiO_2$ is reduced to yield a material having reduced loss and leakage current.

Another aspect of the present novel technology is the provision of a new and improved high energy density capacitor that incorporates at least a layer of nanostructured ceramic material as described herein, and typically with a multilayered structure. For example, the multiple layers of the nanostructured $TiO_2$ separated by layers of electrode material may be employed to build single or multilayer ceramic capacitors for applications requiring high energy density storage (>5J/$cm^3$). A schematic drawing of a multilayer capacitor 10 is shown FIG. 1, with the nanostructured $TiO_2$ layer 15 and the electrode layer 20 staged in alternative to each other. Alternate electrode layers 20 are electrically connected to each terminal end or termination 25, respectively. MLCCs are essentially stacks of capacitors packaged together, and take advantage of the phenomena that energy storage increases as the number and area of the dielectric layers increase and the thicknesses of the dielectric layers decrease.

EXAMPLES

I Microstructural Developments and General Testing Conditions

NANOTEK® $TiO_2$ powders were obtained as starting materials for MLCC production, with powder characteristics and main impurity levels reproduced from the included product data sheet as Tables 1 and 2, respectively (NANOTEK is a registered trademark of Nanophase Technologies Corporation, 1319 Marquette Drive, Romeoville, Ill., 60446, Reg. No. 1978354). Green compacts were prepared by uniaxial pressing at 50 MPa and subsequent cold isostatic pressing at 300 MPa. Sintering was conducted at various temperatures (750° C.-1200° C.) in pure oxygen (1 atm.) or air with different cooling rates (furnace cooling or 1° C./min cooling rate).

TABLE 1

Characteristics of the starting powders

| Characteristics | Value |
| --- | --- |
| Purity | 99.9% |
| Average particle size (nm) | 40 |
| Specific surface area ($m^2/g$) | 38 |
| Bulk density ($g/cm^3$) | 0.20 |
| True density ($g/cm^3$) | 3.95 |
| Crystal phase | 80% anatase and 20% rutile |

TABLE 2

Main impurities in the $TiO_2$ powder

| Elements | Impurity level (%) |
| --- | --- |
| Fe | 0.037 |
| Mg | 0.032 |
| gCa | 0.024 |
| Al | 0.0089 |

Figure 2:
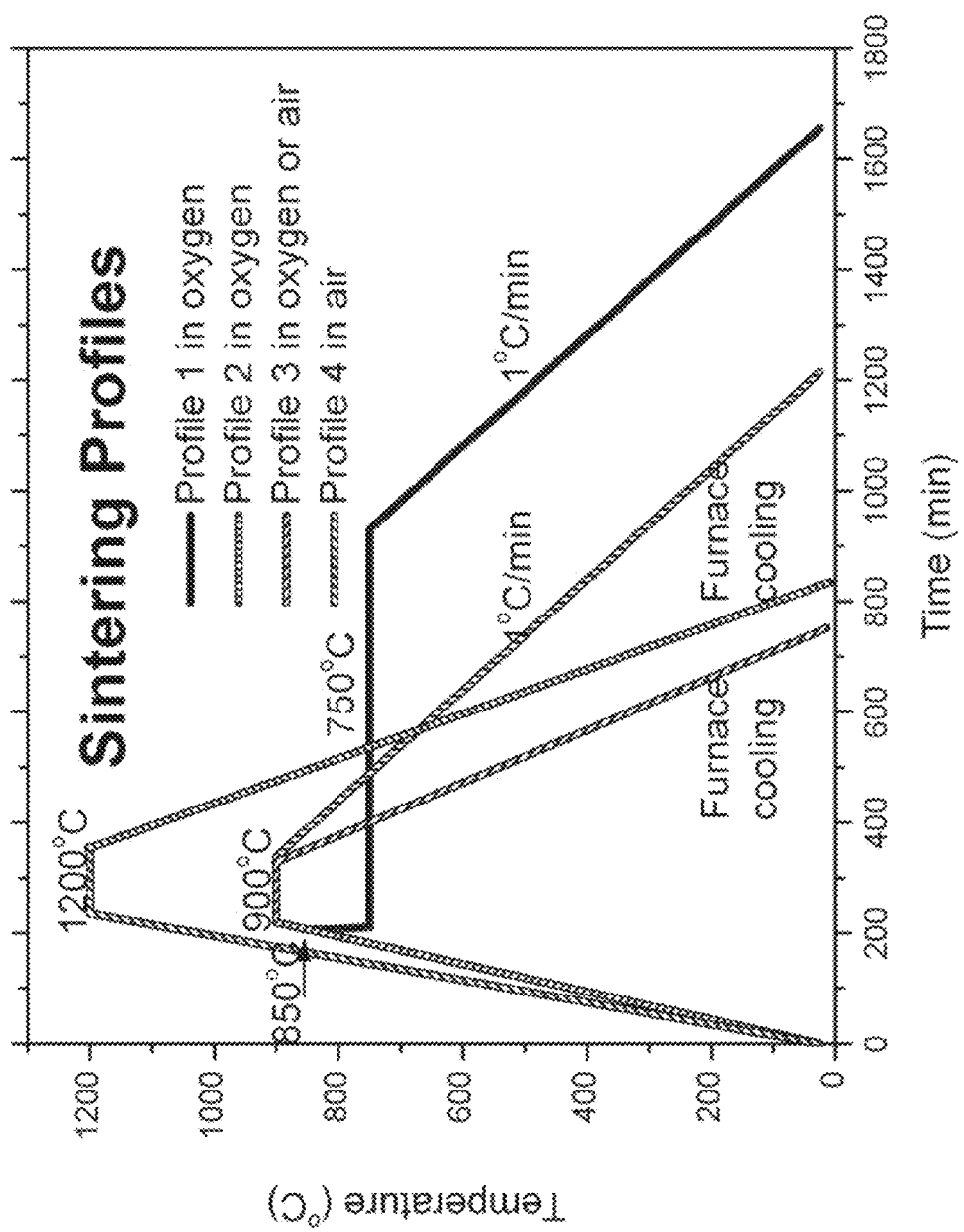
FIG. 2 summarizes the sintering profiles of sintered titania bodies having microstructures characterized by nano-scale grain size and particle size distributions according to a second embodiment of the present invention.

FIG. 2 summarizes the sintering profiles of each sample, among which profile 1 was conducted according to a two-step sintering procedure. The -two-step sintering process involves a rapid heating of a green body to a predetermined temperature, typically without a hold-time, followed by a rapid cooling to a lower temperature at which the presintered material is soaked for a relatively long time in order to achieve densification. While this two-step technique has been effective in some cases to obtain dense ceramics with very small grain size or little grain growth during sintering, the two-step process is typically unnecessary to achieve densified nanostructured titania and like substrates. Conventional sintering, at heating rates on the order of 5° C./min up to about 800° C. and with 6 hours soak time in oxygen or oxidizing atmospheres was sufficient to achieve substrates having excellent dielectric properties.

The relative density of each sample was determined by Archimedes' method using water as the immersion liquid and assuming the theoretical density of anatase and rutile $TiO_2$ are 3.89 $g/cm^3$ and 4.25 $g/cm^3$, respectively. Phase evolution was identified by XRD and the microstructure of the as-fired surface of $TiO_2$ ceramics was observed by SEM. Grain size was determined by the linear intercept method on SEM photomicrographs.

Samples of 10 mm diameter and 0.6 mm thickness were prepared for electrical property measurements. The sample surfaces were polished via 1 μm diamond suspension and painted with sliver paste as top and bottom electrodes. After electroding, the samples were baked at 300° C. to ensure good contact between sample surface and the silver electrodes. D.C. conductivity and current-voltage characteristics were measured by a two-probe method in ambient atmosphere. Impedance spectroscopy was measured in the frequency range of 1 Hz-1 MHz with a voltage amplitude of 1V and analyzed. Relative dielectric constant values were calculated from the capacitance as measured. Polarization versus electrical field relationships were measured on a ferroelectric tester. For breakdown strength (BDS) measurements, D.C. voltage was supplied by a high voltage generator with a fixed ramp rate of 200V/second.

Figure 3:
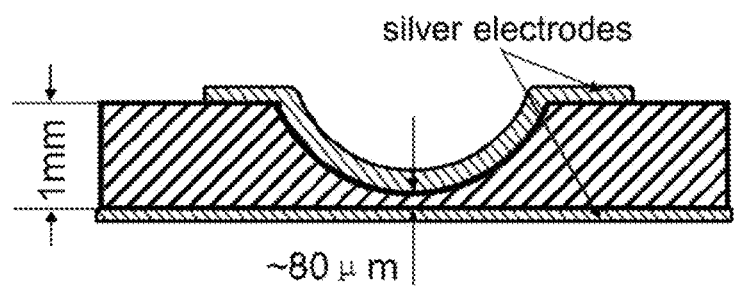
FIG. 3 is a schematic illustration of a body of FIG. 2 having a dimpled electrode configuration for BDS measurement.

A dimpled electrode configuration was employed for BDS measurements, as shown in FIG. 3, so as to minimize contributions of edge-effects of the electric field and thus enjoy the maximum electrical stress concentration at the bottom of the dimple, as this specific specimen configuration reduces/suppresses the phenomenon of edge breakdown.

II Sample Characterization

Figure 4:
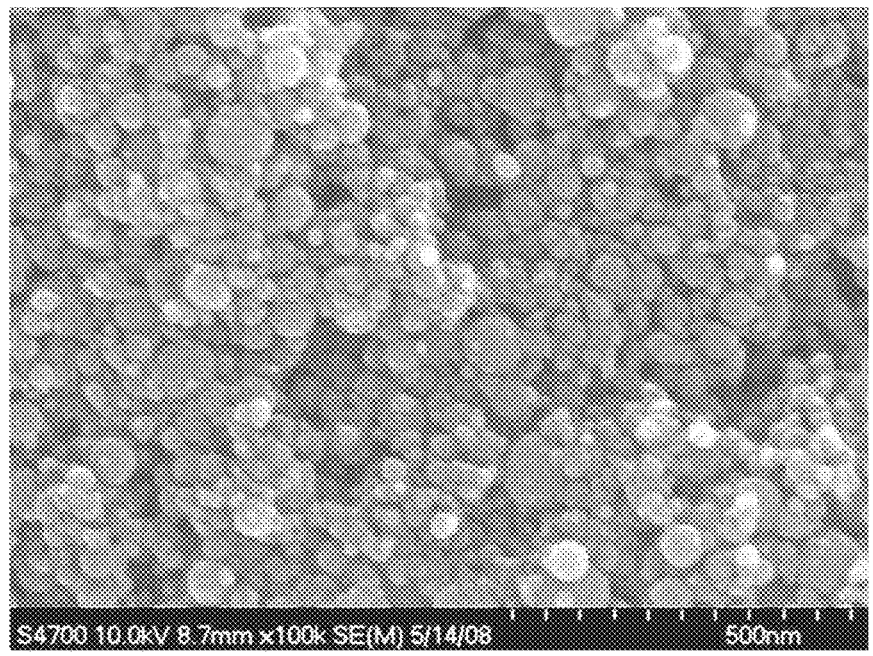
FIG. 4 is the SEM photomicrograph of precursor $TiO_2$ nano powders.

FIG. 4 is the SEM image of the starting powders, which shows that the powders are typically composed of particles that are generally spherical in shape and with a particle size less than 50 nm. The relative density of $TiO_2$ ceramics sintered in various conditions is summarized in Table 3. Table 3 shows that except for sample T750, all the other samples achieved a relative density higher than 98%. By using the two-step sintering procedure, nanosized $TiO_2$ powders can be sintered to a relative density of about 96% at temperatures as low as 750° C. All samples sintered at 900° C. achieved almost identical relative densities of about 99%, suggesting that sintering atmosphere and cooling rate do not have a significant effect on the densification process.

TABLE 3

Relative density obtained in various sintering conditions

| Sintering conditions | Sample name | Relative density (%) |
| --- | --- | --- |
| 850° C.-750° C. 12 h in $O_2$ 1° C./min cooling rate | T750 | 95.61 |
| 900° C. 2 h in air furnace cooling | T900A | 99.23 |
| 900° C. 2 h in $O_2$ furnace cooling | T900F | 98.80 |
| 900° C. 2 h in $O_2$ 1° C./min | T9001C | 98.89 |

TABLE 3-continued

Relative density obtained in various sintering conditions

| Sintering conditions | Sample name | Relative density (%) |
|---|---|---|
| cooling rate 1200° C. 2 h in air furnace cooling | T1200A | ~100 |

Figure 5:
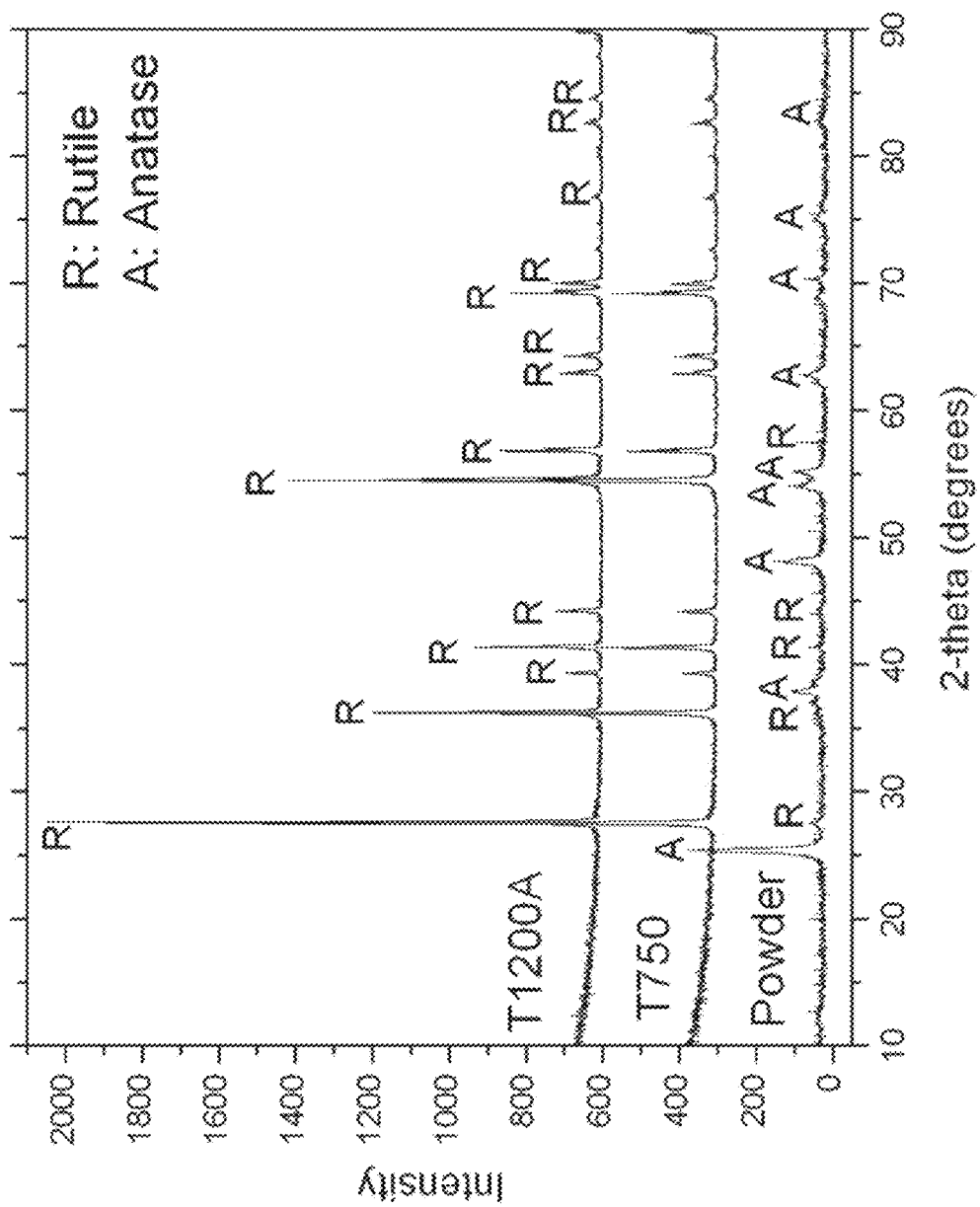
FIG. 5 is a plot illustrating the XRD profiles of precursor powder and two sintered bodies (T1200A and T750).

FIG. 5 shows the XRD patterns of the samples (T750 and T1200A) sintered in different conditions together with the staring powder (Powder). As shown in FIG. 5, the starting powder is mainly composed of anatase, while there is no anatase phase left in the sintered samples. Normally, the anatase to rutile transition temperature is about 915° C. In this case, nanosized starting powders may help to reduce the transition temperature. No secondary phase is detected, therefore, as sintered samples are all phase pure rutile $TiO_2$.

Figure 6A:
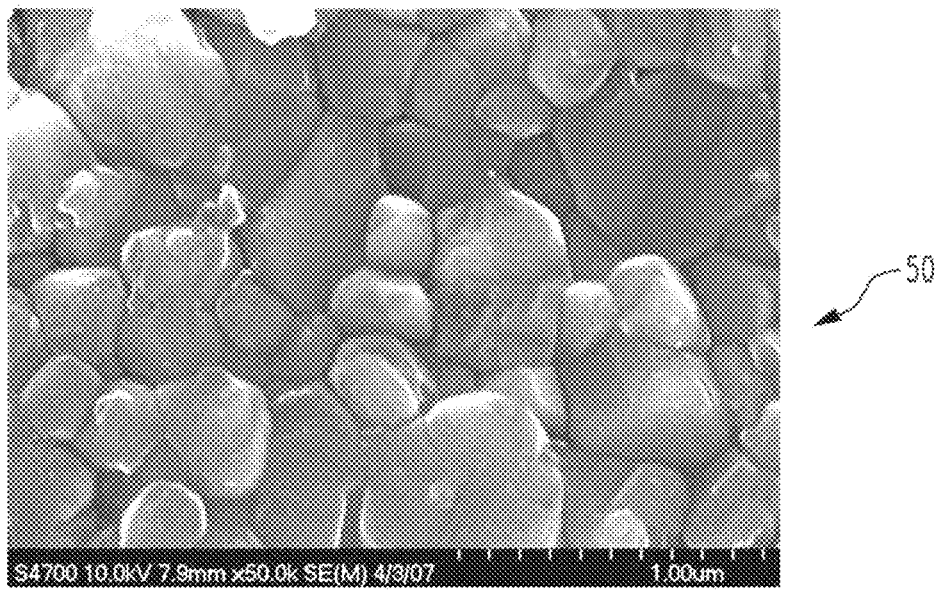
FIG. 6A is a first SEM photomicrograph of the sintered bodies.
Figure 6B:
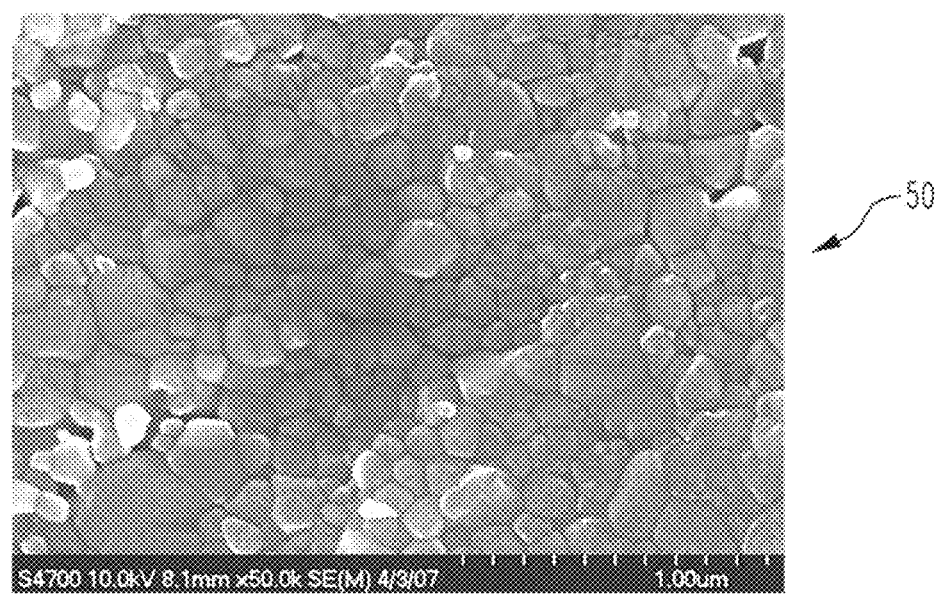
FIG. 6B is a second SEM photomicrograph of the sintered bodies.
Figure 6C:
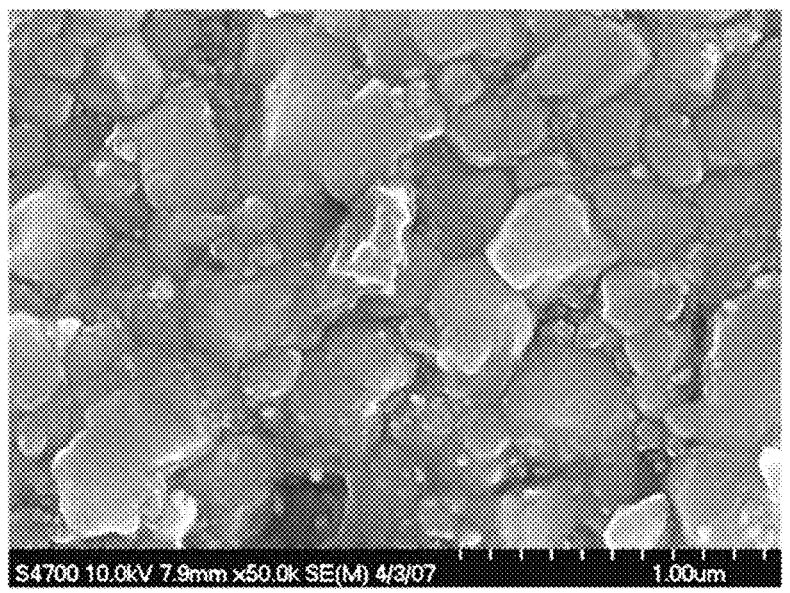
FIG. 6C is a third SEM photomicrograph of the sintered bodies.
Figure 6D:
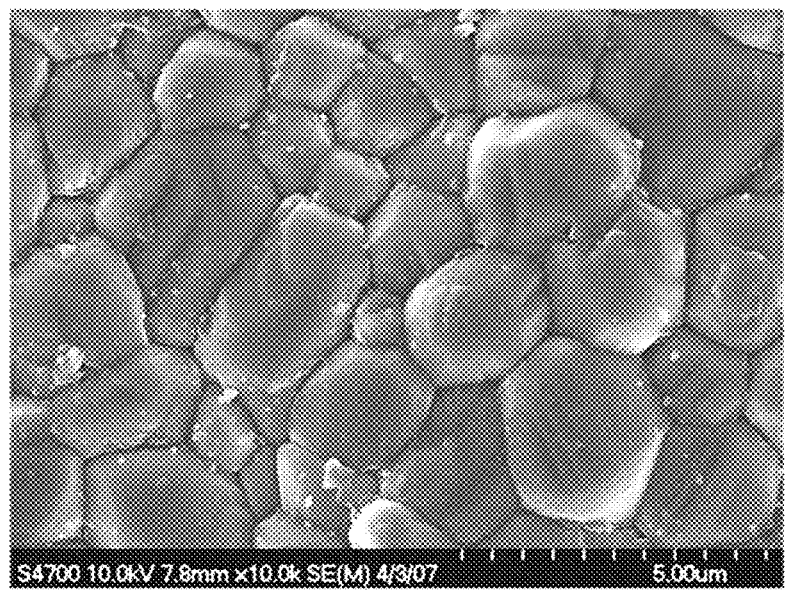
FIG. 6D is a fourth SEM photomicrograph of the sintered bodies.

FIGS. 6A to 6D show the representative SEM images of the microstructure of $TiO_2$ ceramic substrates 50 sintered at different conditions. FIG. 6A shows that the grain size is about 150 nm for specimen 50 sintered at 750° C.; FIG. 6B shows that the grain size is about 300 nm for a substrate 50 sintered at 900° C.; and FIGS. 6C and 6D show that the grain sizes further grow to about 3 μm after sintering substrates 50 at 1200° C. Furthermore, as shown in FIGS. 6A to 6D, the bimodal distribution of grain size indicates that grain grows via an Oswald-ripping mechanism.

III Dielectric Properties of the Samples

FIG. 7A shows the dielectric constant of each sintered sample. Over the frequency range from 100 Hz to 100K Hz, the dielectric constants of all samples show little or no dispersive characteristics. As shown in FIG. 7A, sample T750 has the lowest dielectric constant around 125, while the other samples have higher dielectric constants about 145. Residual porosity is believed to be the major reason that leads to lower dielectric constant of sample T750. The previous studies have shown that the dielectric constant of $TiO_2$ single crystal (rutile) along c-orientation is about 170 and along the a-orientation is about 86. The randomly orientated polycrystalline $TiO_2$ ceramics is believed to have a dielectric constant around 100. The sintered samples tend to be slightly oriented, resulting in the higher dielectric constants than expected.

FIG. 7B illustrates the dielectric loss of the sintered samples. Dielectric loss is generally low, especially in the high frequency range, such that the dielectric loss is about 0.04% for sample T9001C at 100K Hz. In FIG. 7B, sample T1200A has the highest dielectric loss followed by sample T750. The relative high dielectric loss of sample T750 may be attributed to its surface conduction due to its relatively low density. Samples T1200A was sintered in air at high temperature, indicating that the loss may associate with oxygen vacancies generated during high temperature sintering.

It is widely believed that the predominant defects in n-type $TiO_2$ are oxygen vacancies, which may be expressed by Kröger-Vink notation as follows:

$$O_o^x = V_o^{\bullet\bullet} + 2e' + \frac{1}{2}O_2 \tag{5}$$

Based on equation (5), two extra electrons may be generated for each oxygen vacancy created. As a result, relatively high conductivity is expected in samples with high concentration of oxygen vacancies. As shown in FIG. 7B, the dielectric loss increases with decreasing frequency for sample T1200A, which may be a characteristic of conduction loss, since normally conduction loss is the dominate loss mechanism at lower frequencies.

Figure 8:
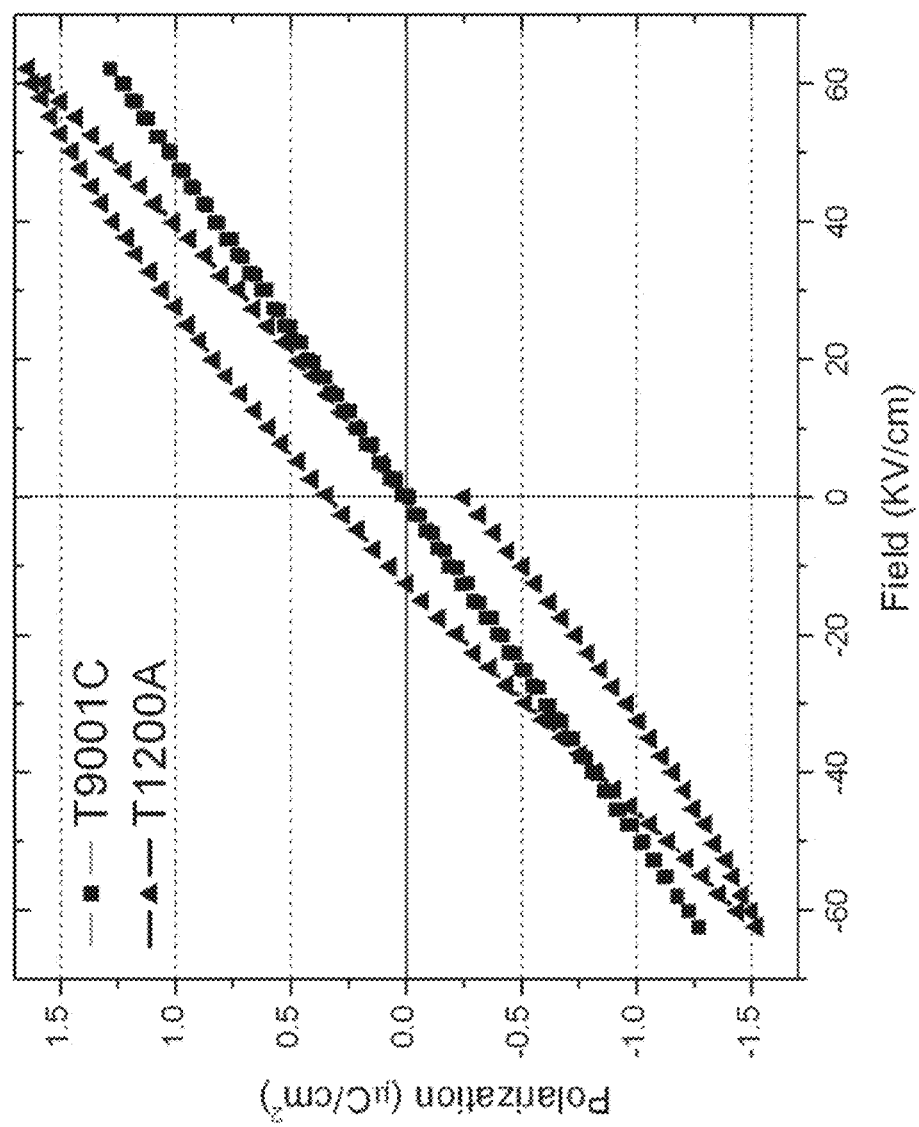
FIG. 8 is a plot illustrating the polarization vs. electrical field of the sintered bodies.

FIG. 8 shows the Polarization versus Electric field (P-E) relationship of two sintered samples (T9001C and T1200A). As shown in FIG. 8, the P-E curve of Sample T1200A demonstrates hysteresis loop, an indication of conduction loss. On the contrary, the P-E curve of Sample T9001C is of a linear P-E relation with polarization about 1.25 $\mu C/cm^2$ at 62 KV/cm. A calculation based on the slope of the P-E curve of Sample T9001C gives a dielectric constant of 228, which is higher than what measured in FIG. 7A. Since polarization was measured at low frequency, enhanced dielectric constant may come from the contribution of space charge polarization.

Figure 9:
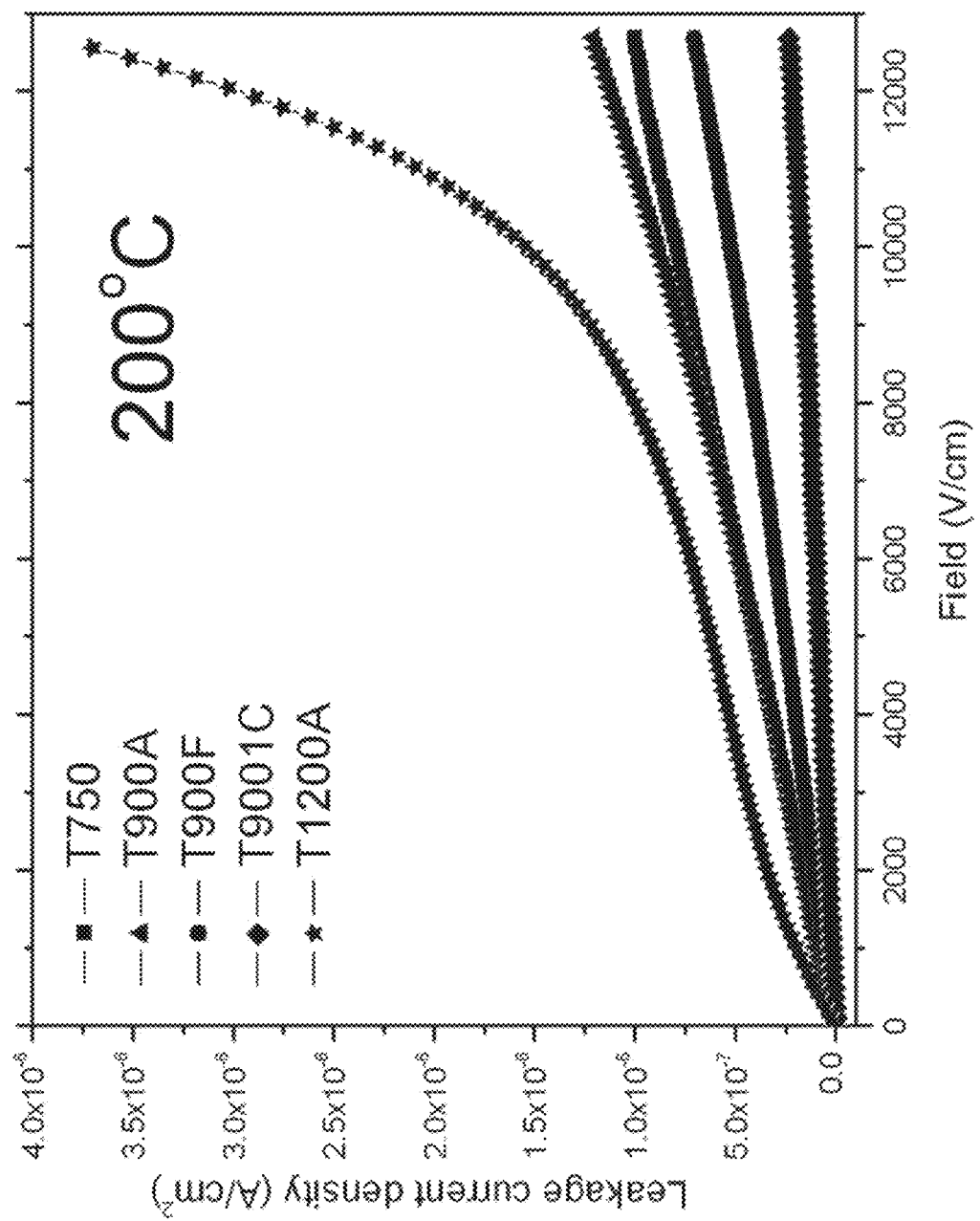
FIG. 9 is a plot illustrating the current-voltage characteristics of $TiO_2$ ceramics sintered in various conditions.

FIG. 9 plots the Current-Voltage (I-V) characteristics of the sintered samples, where the leakage current densities were measured at 200° C. in ambient air. Sample T1200A demonstrated the highest leakage current with a non-linear behavior. The similar behavior has been found in single crystal rutile, which indicates field dependent conductivity, especially for reduced samples. The non-linear I-V characteristic observed of Sample T1200A is also an indication that this sample is not electrically uniform, some part of the microstructure (most likely grain boundaries) may start to breakdown at higher field strength. This phenomenon will be discussed in more detail below together with the interpretation of impedance spectra.

The Current-Voltage characteristics for the other samples are of the linear or ohmic behavior. As expected, sample T9001C, which was sintered in oxygen atmosphere and cooled off at a gradual cooling rate (1° C./min), has the lowest leakage current. Once again, a sintering condition in oxygen atmosphere followed by slow cooling is believed to help minimize the oxygen vacancy concentration and electrical conductivity. Particularly, the cooling rate is of interest as the defects concentration may 'freeze' at the high temperature level if there is not enough time for the sample to equilibrate with the sintering atmosphere during the cooling off process.

Figure 10:
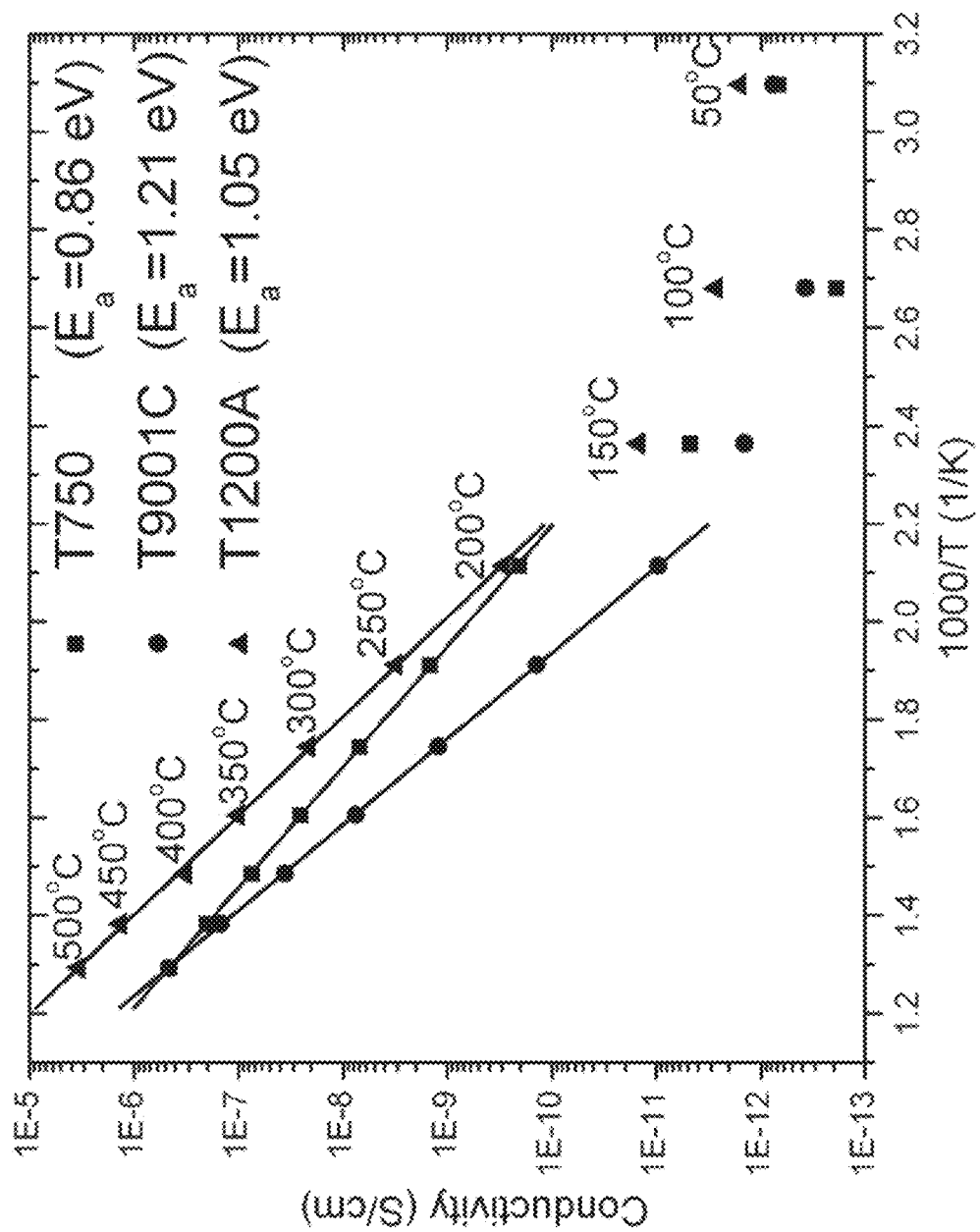
FIG. 10 is an Arrhenius plot of conductivity of $TiO_2$ ceramics sintered in various conditions.

FIG. 10 is an Arrhenius plot of conductivity of three sintered samples measured at low field (~160V/cm). Sample T1200A has the highest conductivity especially at high temperature range, while Sample T9001C demonstrates the lowest conductivity especially at low temperature range.

The conductivity can be used to determine the activation energy ($E_a$), which can be calculated in the temperature range of 200° C.-500° C. according to the following equation:

$$\sigma = \sigma_0 \exp(-E_a/kT) \tag{6}$$

where σ, $\sigma_0$, k, and $E_a$ represent the conductivity, pre-exponential factor, Boltzmann constant and activation energy of mobile charge carriers, respectively.

The activation energies obtained in this study range from 0.86 eV to 1.21 eV, which are typical values of migration enthalpy for ionic defects. The activation energies of the sintered sample obtained in this study are comparable with literature, while less than those obtained from the single crystal samples. Sample T750's activation energy is much lower than those of the others, which may indicating a small grain size sample has lower activation energy. Similar phenomenon has also been observed in $CeO_{2-x}$ samples, which suggested that the atomic level origin of this behavior lies in the lower vacancy formation enthalpy at grain boundary sites.

FIG. 10 also shows that the linear relationship between conductivity and reciprocal temperature cannot be extended to temperature lower than 150° C. At 50° C., the conductivities of all three samples (~$10^{-12}$ S/cm) are much higher than the extrapolated values (would be in the range of $10^{-16}$ to $10^{-14}$ S/cm). The elevation of conductivity at low temperature indicates that the dominant conduction mechanism is ionic conduction, because at lower temperatures ions will not have enough thermal energy to substantially move. Interestingly, the conductivities measured at 50° C. are actually higher than those measured at 100° C. for sample T9001C and T750. This behavior may due to the effects of surface conduction in the presence of moisture.

Figure 11A:
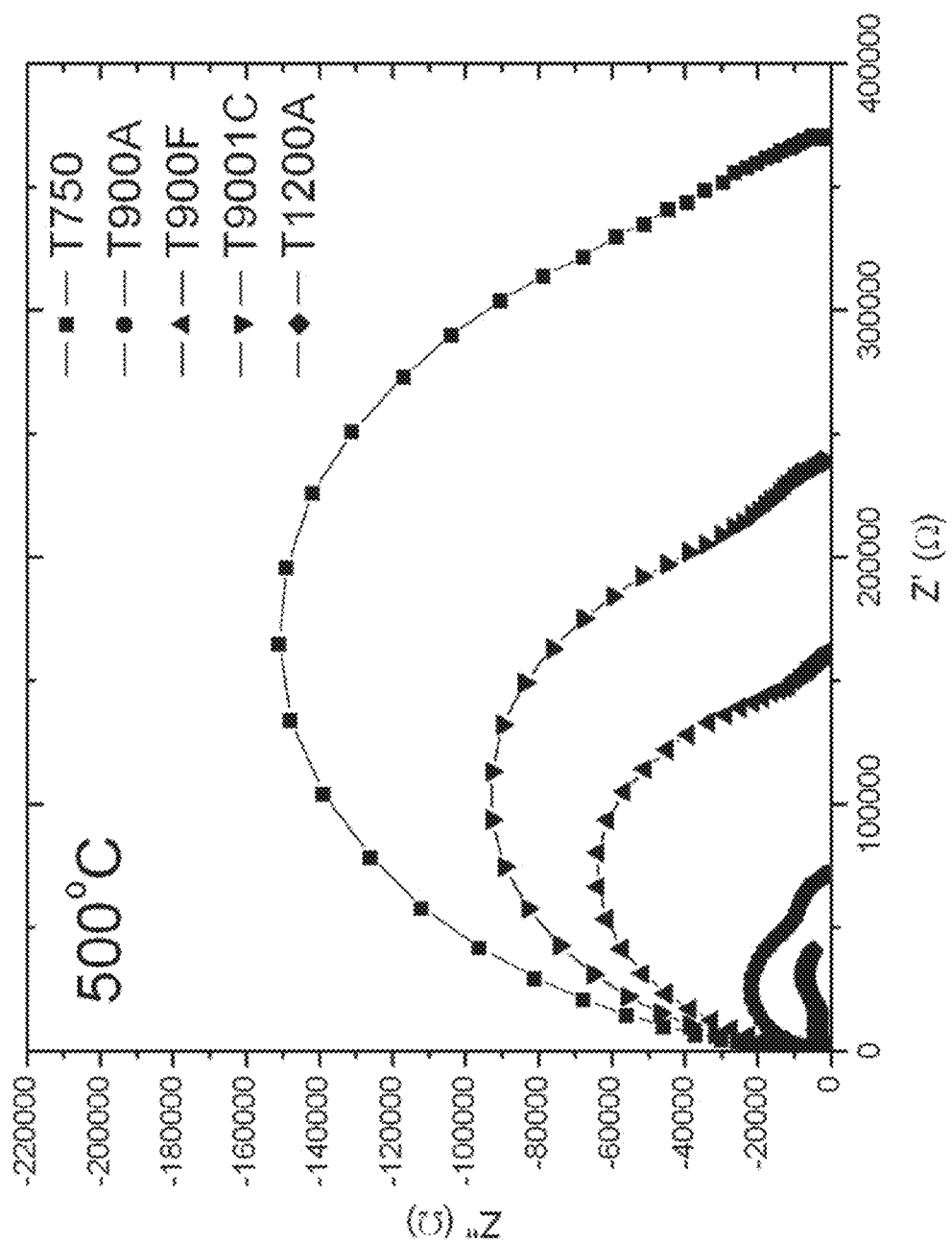
FIG. 11A shows complex impedance spectra of $TiO_2$ ceramics sintered in various conditions.

Impedance spectroscopy is a powerful technique used to characterize electronic ceramics, since it allows the intrinsic (bulk) properties to be distinguished from extrinsic contributions such as grain boundaries, surface layers, and electrode contact variations. The electrical responses of the sintered samples in the frequency range of 1 Hz to 1M Hz were measured at 500° C. and plotted in cole-cole curves as shown in FIG. 11A. In the order of T750-T9001C-T900E-T900A-T1200A, the overall resistances (intercept with the real axis, Z') of the samples decrease sequentially, which is in agreement with the D.C. conductivity measurements. Except for Sample T1200A, which shows two overlapped and depressed semi-circle, the plots of the cole-cole curves for the remaining samples have the general form of semi-circles.

Figure 11B:
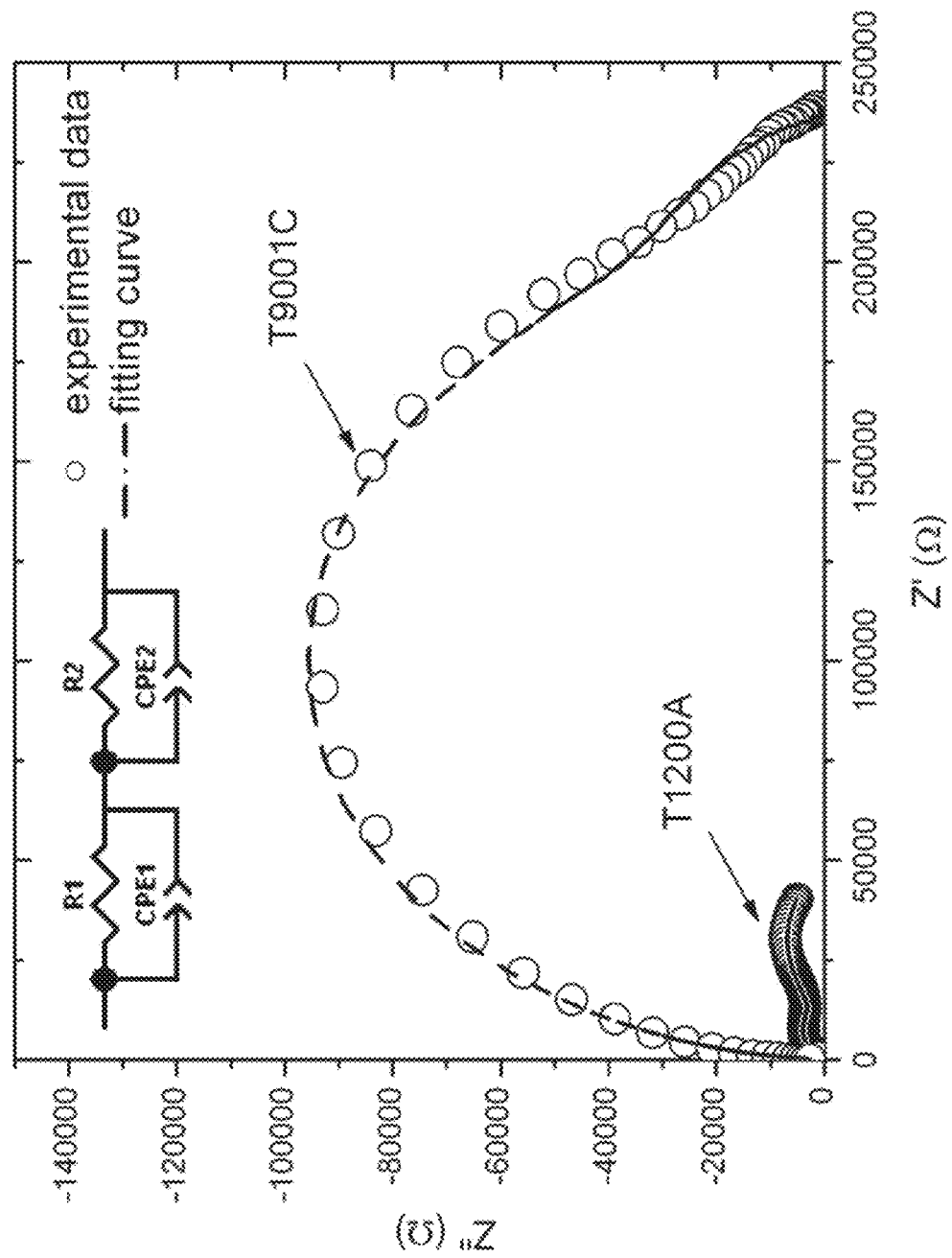
FIG. 11B shows the fitted curves of sample T9001C and T1200A.

The impedance spectra can be well fitted by using two R-C (resistor-capacitor) or R-CPE (resistor-constant phase element) parallel circuit elements connected in series, as shown in FIG. 11B. In FIG. 11B, the larger semi-circular plot is the response of the grain since the dielectric constant calculated based on capacitance value is around 150 corresponding well with the previous dielectric constant measurement. The second, smaller semi-circular plot located in the lower frequency range is normally attributed to the grain boundary response. Grain boundaries typically have higher electrical resistance (R) and capacitance (C) as compared to the R and C values of the grains themselves, and therefore the grain boundary relaxation time $\tau=RC$ is correspondingly larger. At characteristic frequency $f=(2\pi\tau)^{-1}$, the grain boundary frequency is lower than that of the grain.

Figure 12:
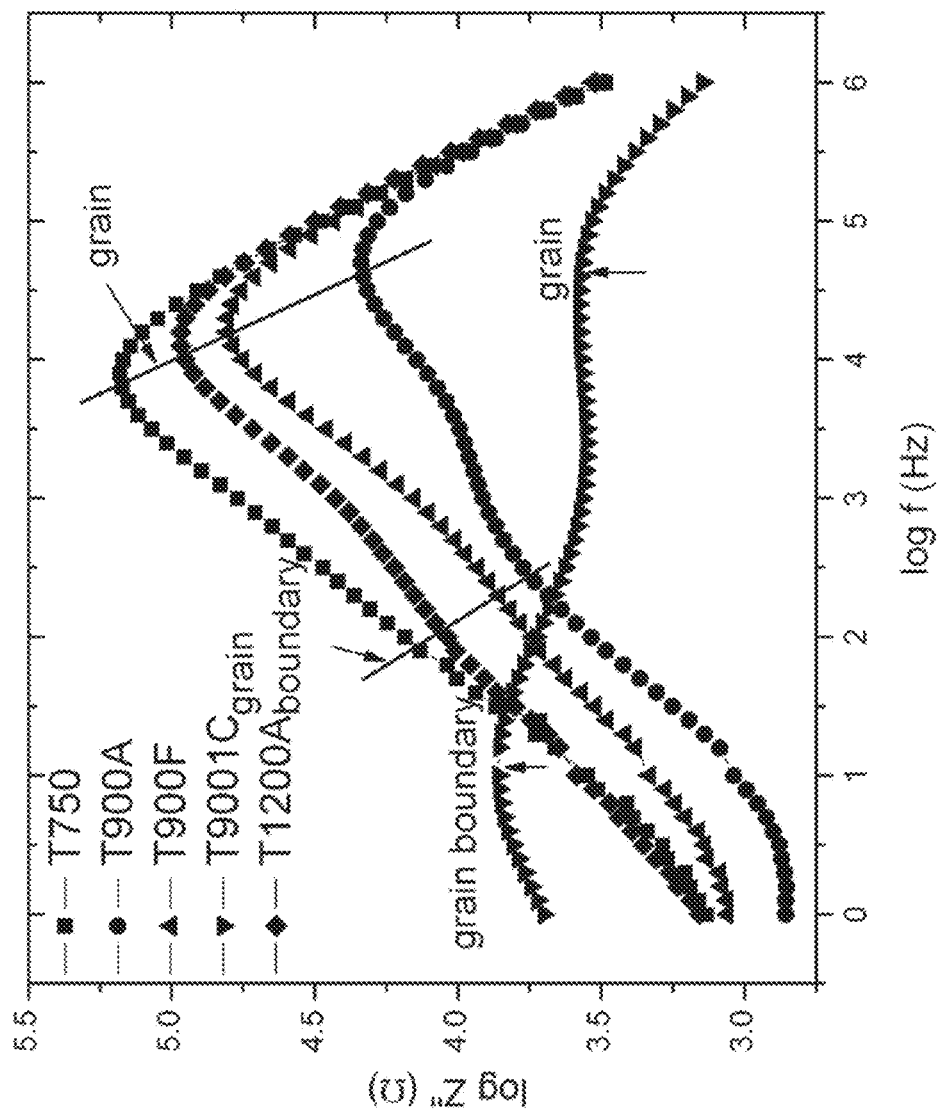
FIG. 12 is a plot showing the imaginary parts of impedance (Z") versus frequency.

By plotting the imaginary components of impedance, Z", against frequency, as shown in FIG. 12, the responses of the grain and the grain boundary can be separated more clearly. As Z" is dominated by the most resistive element, it can be seen that for samples T750, T900A, T900F, and T9001C, the high frequency grain response dominates the resistivity of the sample, while for sample T1200A, the low frequency grain boundary response dominates the resistivity of the sample.

The observation of a significant grain boundary response in T1200A is interesting. The total grain boundary resistivites, ($R_T$, $\Omega/m^3$), of T9001C and T1200A are very close to theoretical prediction. Since the difference in mean grain sizes (d, m) of these samples is about one order of magnitude, there is a corresponding order of magnitude difference in specific grain boundary resistivity ($R_s$, $\Omega/m^2$) according to the following equation:

$$R_T = \frac{R_s}{d} \qquad (7)$$

In other words, the specific grain boundary resistivity has a reverse relation with the grain size. Since there is no direct evidence showing any physical and/or chemical changes in the grain boundary, it is expected that as grains start to grow into the microsize range and as the total grain boundary area decreases, the impurity concentration in the grain boundary will increase. Normally, the presence of impurities in the grain boundary increases the resistivity of the grain boundary, so the grain boundary response starts to become increasingly relevant as the grain size increases.

Likewise, when the effects of the grain boundary response starts to become significant, the high frequency semi-circle representing the grain response shrinks dramatically, suggesting that at a relatively high sintering temperature the impurities originally inside of the grains began to diffuse outside to the grain boundaries. As the grain boundary becomes the most resistive part in Sample T1200A, most of the electric field is confined to the grain boundary instead of the grain. Since the grain boundary is relatively thin as compared to the dimensions of the grain itself (typically less than about 1 nm as compared to a typically grain diameter of about 200 nm), the confinement of the electric field at the grain boundary gives rise to earlier breakdown and initiates the ultimate electric breakdown process. This notion is supported by I-V the curve of Sample T1200A, exhibiting the highest leakage current and non-linear behavior.

As noted above, the grain boundary is quite thin, with a typical thickness of less than 1 nm. The grains themselves are also unusually small (typically around 200 nm in diameter), thus the total surface area of the grains is unusually large. The grain boundary material is thus spread quite thinly over the grains, with a calculated volume of less than about 1.5% of the total volume of the sintered substrate. In such sintered nanoscale substrates having substantially elevated total grain surface area, the grain boundary phase must either be spread substantially thin or present in greater than usual proportion. If the latter, then the total amount of impurities present in the grain boundary phase would necessarily be diluted, resulting in a grain boundary phase having a substantially low concentration of impurities. Likewise, the oxygen stoichiometry and defect chemistry present in the grain boundary phase (as well as the grains themselves) may more prominently influence the electronic properties of the system as grain size and grain boundary thickness decrease.

Figure 13:
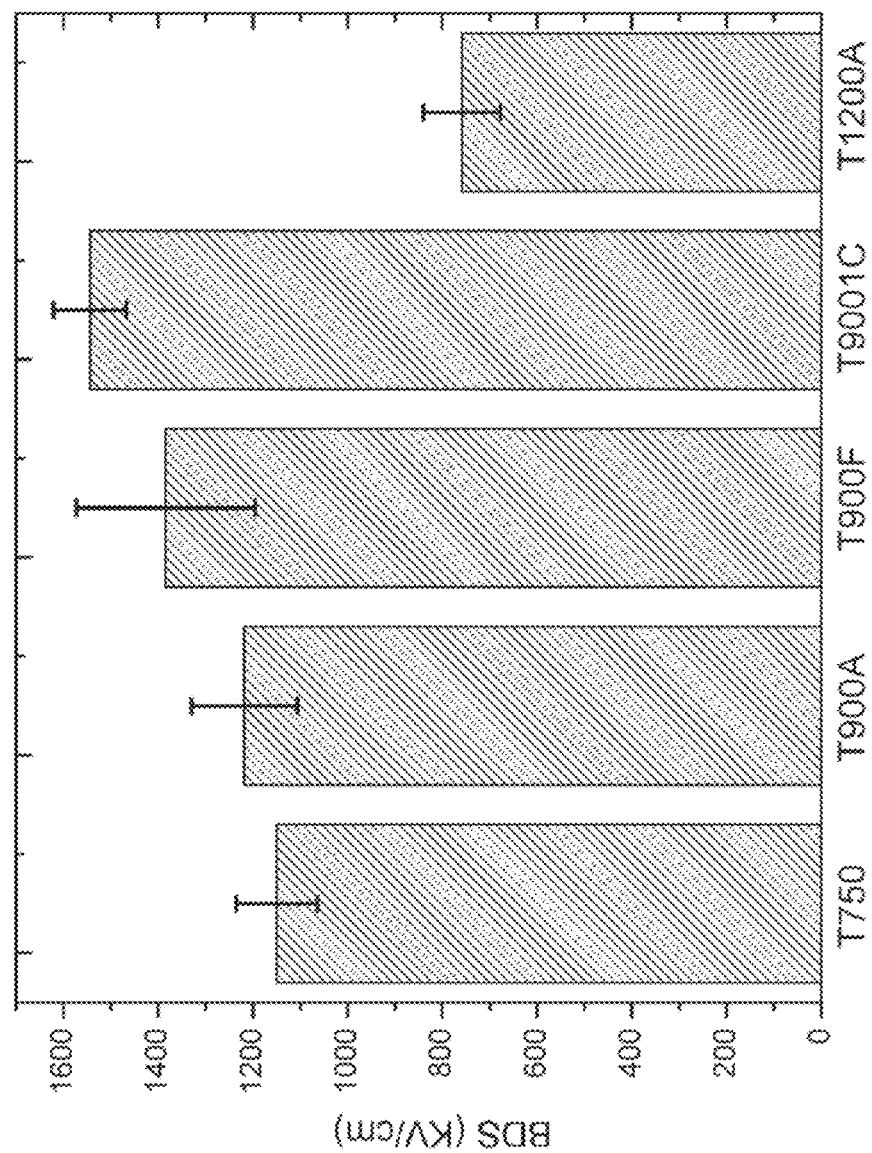
FIG. 13 is a plot illustrating dielectric breakdown strength of $TiO_2$ ceramics sintered in various conditions.

FIG. 13 plots the D.C. dielectric breakdown strength of each sintered sample. The BDS was measured on samples with dimpled configuration (as shown in FIG. 2), and, as a result, the maximum electric stress is located at the bottom of the dimple (i.e., the thinnest point). Consequently, the intrinsic BDS of a sintered sample was measured, as the edge effect (field concentration at electrode edge) was thus minimized or substantially eliminated.

Figure 14:
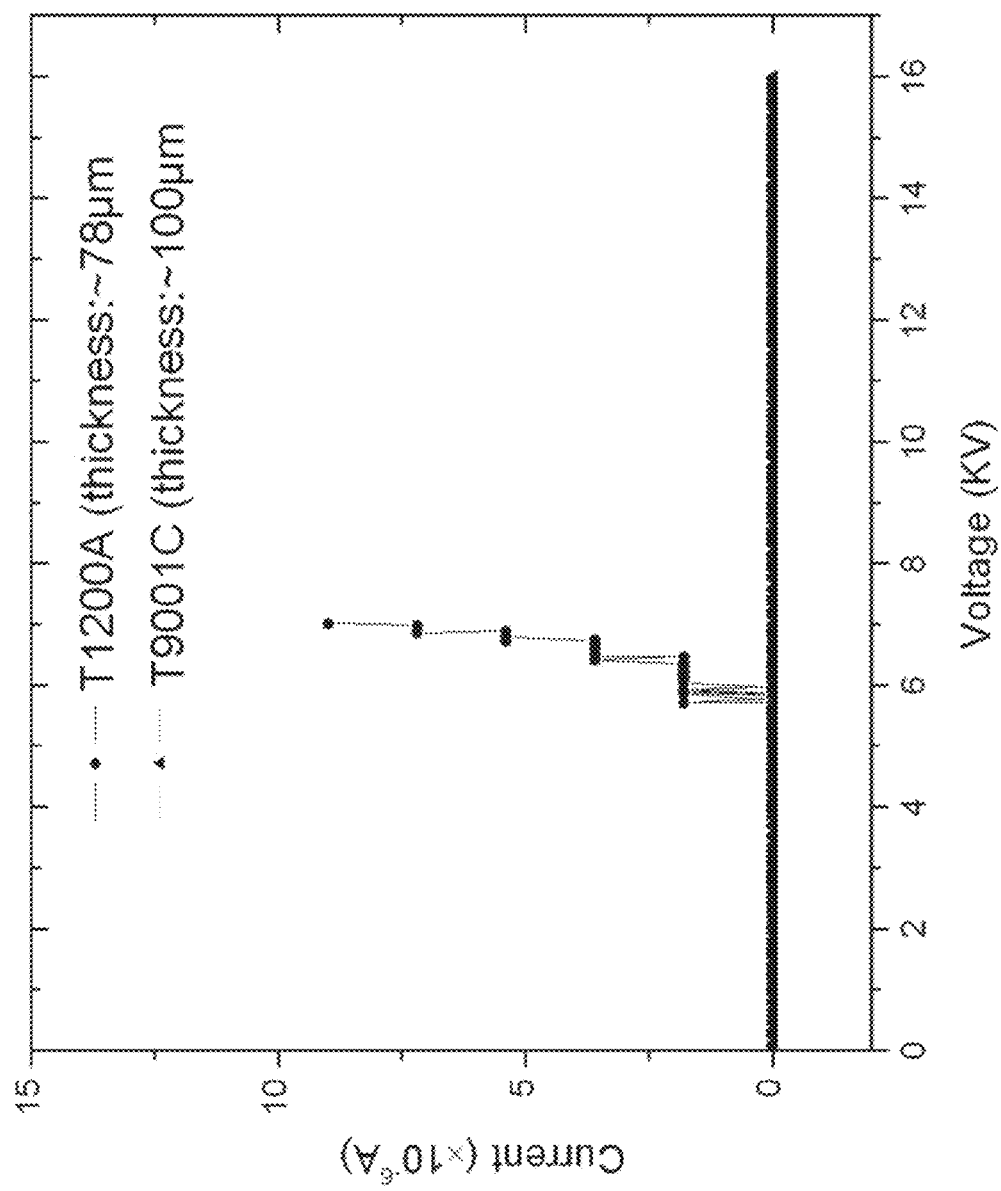
FIG. 14 is a plot illustrating the I-V curve during the breakdown strength test.

In FIG. 13, a reverse relationship between the BDS and the leakage current was observed, which indicates that the breakdown process is electronic in nature. Except for Sample T1200A, all the samples exhibited breakdown strengths higher than 1000 KV/cm. This behavior suggests that breakdown strength might have a grain size dependence, which is in agreement with previous researches on $BaTiO_3$ ceramics as well as $TiO_2$ ceramics. It has long been noticed that there is a correlation between breakdown strength and mechanical strength. Since refinement of the grain size reduces the critical flaw size which determines both mechanical strength and breakdown strength, fine gained samples are expected to have higher breakdown strength. However, in this case, sample T750 has the finest average grain size but does not exhibit the greatest breakdown strength; this observation may be due to sample T750's residual porosity. And for samples T900A, T900F, and T9001C, all of which were sintered at the same temperature with similar grain size and porosity, their differences in breakdown strength may more likely be explained by their electrical microstructures. Under optimized sintering conditions (FIG. 2 profile 1), the defects concentration was minimized and the leakage current was likewise reduced. Consequently, the most resistant sample also has the highest breakdown strength. Although Sample T1200A achieved almost 100% density, its breakdown strength is the lowest observed because its overall electrical resistance is the lowest. In addition, for Sample T1200A, voltage is mainly held by thin layer of the gain boundaries, so when critical filed stress is reached the grain boundary will start to fail, initiating the breakdown process. This postulate is supported by the phenomenon that during the breakdown strength test, almost no leakage current was detected for low temperature sintered samples until they failed, while for Sample T1200A a sharp increase of leakage current was observed before dielectric breakdown occurred (as shown in FIG. 14).

According to equation (4), the highest potential energy density about 15J/cm$^3$ is achieved on sample T9001C, which is almost an entire order of magnitude higher than current paper based high energy density capacitors.

Figure 15:
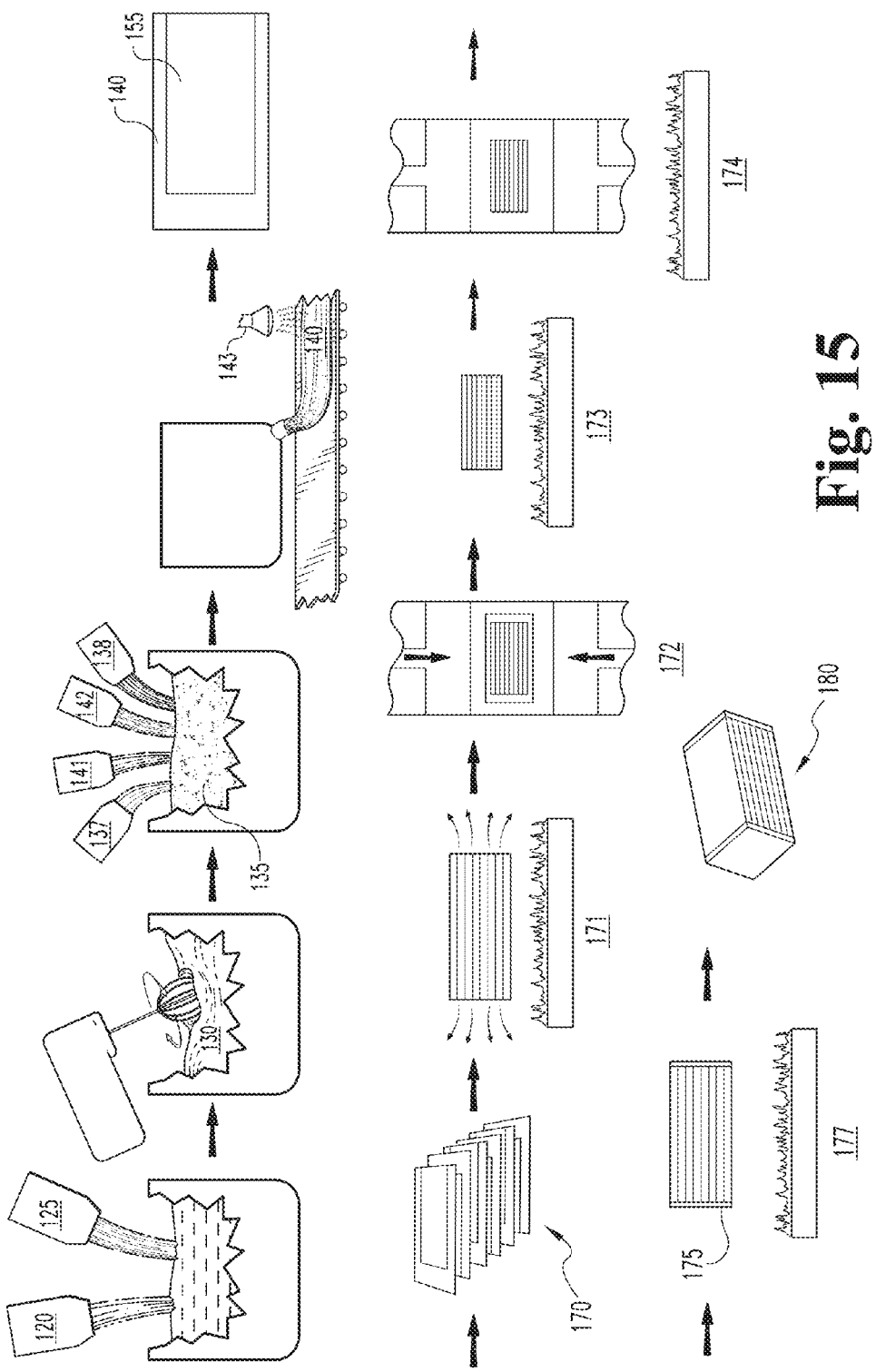
FIG. 15 is an exploded view of a multilayer ceramic capacitor according to a third embodiment of the present invention.
Figure 16:
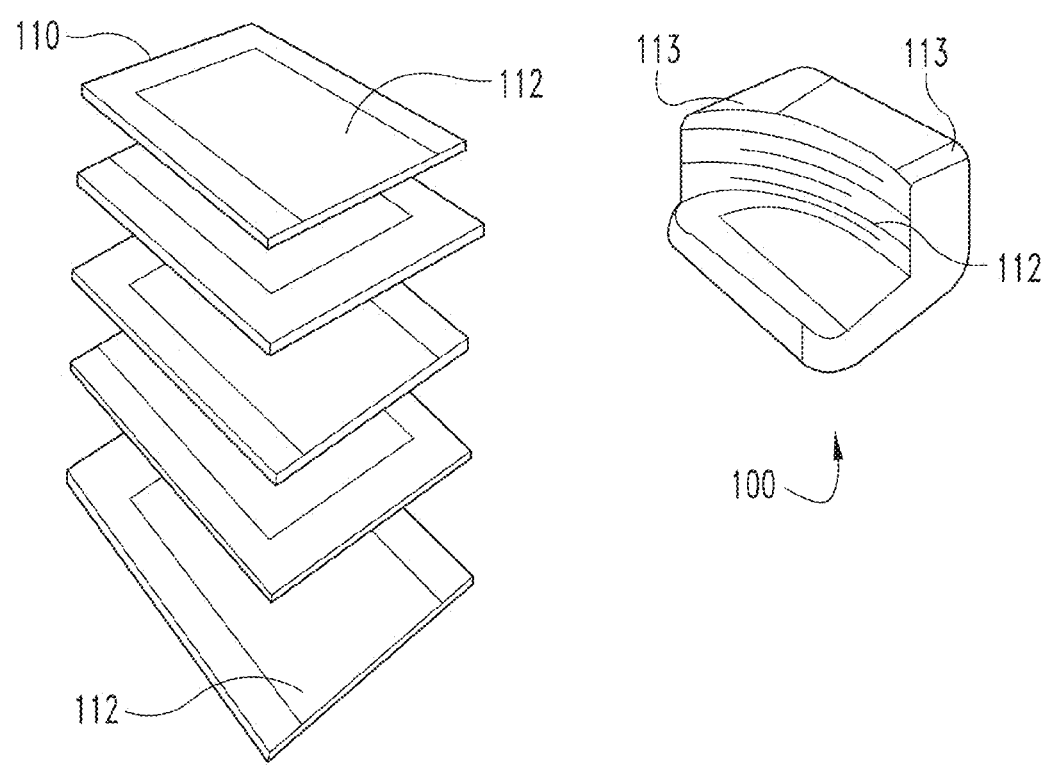
FIG. 16 is a schematic view of a process for producing the capacitor of FIG. 15, according to a fourth embodiment of the present invention.

In another embodiment, as illustrated in FIGS. 15-16, the novel technology relates to a multilayer capacitor 100 having a plurality of generally titanium oxide (titania) dielectric layers 110, separated by electrode layers 112. Alternating electrode layers 112 connect to respective opposing terminal electrodes 113. The titania layers 110 are typically formed from a starting powder of titanium dioxide characterized by a mean particle size less than about 500 nm. Typically, the particle size is <100 nm and more typically between about 40 and about 50 nm. The titanium dioxide powder may be fabricated by any convenient or well known technique, such as oxidation of titanium metal vapor, oxidation of titanium tetrachloride, by chemical precipitation from solutions of titanium alkoxide followed by mild calcinations or the like. The crystal structure of the titanium oxide powder is typically in the form of anatase or rutile, or mixtures of anatase and rutile.

Typically, the titanium dioxide contains less than 1000 ppm of impurities. More typically, common impurities, such as Fe and Al are present in less than about 500 ppm. Also typically, Na and Cl are present in amounts less than about 100 ppm. In some embodiments, the titanium dioxide powder includes one or more dopants that can react with the titanium dioxide during the sintering process. For example, it is well know that ions of similar size to that of $Ti^{4+}$ can substitute in the crystal structure. In particular, ions with higher charge such as $P^{5+}$, $V^{5+}$, $Nb^{5+}$, $Ta^{5+}$, $Mo^{5+}$ or $W^{6-}$ are known to suppress grain growth in titanate materials during sintering and as well as to retard the diffusion of oxygen vacancies under the application of high electric and/or magnetic fields. $V^{5+}$ has been observed to both suppress grain growth and retard oxygen vacancy diffusion in titania dielectric substrates. The concentration level of these "donor" ions is typically less than 1 atomic percent and, more typically, between about 0.01 and about 0.1 atomic percent. Thus, each respective titanium dioxide substrate 110 may include at least one dopant selected from the group including P, V, Nb, Ta, Mo, W, and combinations thereof, the included dopant typically being present in amounts of less than about 1 atomic percent, more typically less than about 0.1 atomic percent, and still more typically less than about 0.01 atomic percent.

In addition, ions with lower charge, such as $Co^{3+}$, $Co^{2+}$, $Ni^{3+}$, $Ni^{2-}$, $Fe^{3+}$, $Fe^{2+}$, $Cr^{3+}$, $Mn^{3+}$, $Mn^{2+}$ and $Mg^{2+}$, may be added to minimize the formation of $Ti^{3+}$ ions during sintering to thereby inhibit semiconduction. Mn is particularly beneficial in this regard. The level of these "acceptor" ions is preferably less than about 1 atomic percent and, more typically, between about 0.01 and about 0.1 atomic percent. These ions may be incorporated into the titania structure by the addition of fine carbonates, oxides, or metal organics to the titania precursors. Common sintering aids such as those based on silicon dioxide, boron oxide, or lithium oxide and compounds of these oxides or their precursors with bismuth oxide, barium oxide, lead oxide, zinc oxide or copper oxide may also be optionally added. The level of sintering aid is typically less than about 5 weight percent and, more typically, less than about 1 weight percent.

A titania-based multilayer capacitor 100 may be made by first forming titanium dioxide powder into ceramic "green" tape by procedures well known to those with ordinary skill in the art. Alternately, other convenient processing techniques may be used to form thin sections of titania. Typically, predetermined amounts of titanium dioxide 120 and additive/dopant precursors 125 (typically powder blends, but alternately solutions, suspensions, or the like) are combined and mixed to yield a homogenous mixture 130, and then are de-agglomerated and dispersed in a slurry 135 containing an organic binder 137 and a solvent 138 before casting onto a steel belt or polymeric carrier film to yield a green tape 140, which is subsequently dried 143. The organic binder 137 can be selected from polyvinyl butyral (PVB), acrylic, polycarbonate, or other suitable polymeric resins. Commonly used plasticizers, such as dibutyl phthalate or butyl benzyl phthalate, may also be added with the polymeric binder 137 to adjust the flexibility and laminating properties of the green tape 140. Suitable solvents 138 may be selected from ethanol, ethyl acetate, butyl acetate, acetone, methyl ethyl ketone (MEK), or others commonly used for this purpose. Dispersing or wetting agents 141 such as phosphate esters, organic acids, or polymers such as PVB may be used to reduce the viscosity of the slurry and permit a higher solids loading. In addition, a release agent 142 such as propylene glycol can be added to the slurry 135 to assist release of the dried tape 140 from the steel belt or carrier film. A tape 140 thickness of about to 2 to 50 μm may be produced. Tape thickness is typically about 15 μm.

The internal electrodes 112 of the titania multilayer capacitor 100 are provided by applying to the green tape 140 thin layers of metal paste 155, such as by a screen-printing process. The titania tape and metal layers 140, 155 alternate with one another. The metal paste typically consists of a metal powder with particle size of about 1 μm or less, an organic resin, a dispersing agent and a solvent. The metal layer 155 is selected from Pt, Au, Pd and alloys such as Pt—Pd—Au, or Pd—Ag. Typically, the metal layer 155 is Au, and more typically the metal layer is Pd. PdO may be used in place of Pd metal. While the use of these precious metals provides ease of processing, their cost is relatively high, encouraging the use of less expensive electrodes, such as those based on Ag. Also, in other embodiments, base metals such as Ni, Cu, W, and alloys such as Nichrome or stainless steel, or conducting oxides such as indium-tin oxide ($In_2O_3$—$SnO_2$) might be applied as the electrode layers 155, although care would have to be taken to protect some choices from oxidation and the sintering temperature might have to be controlled sufficiently to avoid reduction of the titanium oxide during sintering in atmospheres with low oxygen content, such as by "flash" sintering or the like. Alternatively, the sintering temperature could be reduced with a suitable sintering aid.

The organic resin 137 is typically selected from hydroxyl ethyl cellulose, ethyl cellulose, an acrylate such as butyl methacrylate, or a polycarbonate such as polypropylene carbonate. Suitable dispersing agents 141 are phosphate esters or organic dispersants. Suitable solvents 138 are selected from mineral spirits, terpineol, ethyl hexanol or similar liquids typically with boiling point above about 150 degrees Celsius. The metal paste is typically homogenized, such as by bead-milling or roll-milling. A conventional screen printer is used to apply the paste through a fine-mesh screen, such as 400 calendared steel or alpha-mesh. Alternatively, the metal layer 155 may be deposited onto the tape 140 by evaporation or sputtering or by injecting liquid metal such as Pb Sn, Zn or Al into cavities in the sintered dielectric.

Construction of multilayer capacitors 100 may be accomplished by various well known techniques. For example, in the wet-stack process, several layers of tape 140 are laminated together to form a base (cover) on a carrier plate and then electrodes 155 are printed onto the major surface of the base cover layer and dried. A layer of green tape 140 is then applied over the printed electrodes 155 and laminated to the base. If a thicker layer 140 is required, multiple layers of tape 140 may be applied or thicker tape 140 may be produced. Electrodes 155 are then printed onto the tape 140 with a slight offset from the first electrode print. The process of applying tape 140 and printing electrodes 155 with an alternate offset is repeated until the required number of layers 140, 155 is obtained. Normally, the number of inner electrode layers 155 would range from 2 to about 100. A top cover, similar in thickness to the base cover, is then laminated to the stack 170. The laminated stack 170 is removed from the base plate and consolidated by isostatic pressing. Individual green multilayer capacitors (MLC's) 100 can then be cut from the build in a process known as dicing.

Most of the organic binder 137 in the capacitors 100 must be removed before they can be sintered. This is accomplished by heating them in an oven, in air, at a rate of about 0.2 degrees Celsius per minute up to a temperature of between about 300 and about 400 degrees Celsius, more typically about 350 degrees Celsius, and holding it for about 1 hour. After the binder removal process 171 the capacitors 100 are typically placed in a rubber pouch and subjected to cold isostatic pressing (CIP) 172 at between about 20,000 and about 100,000 psi (or between about 138 and about 690 MPa), more typically between about 40,000 and about 60,000 psi, yet more typically at least about 45,000 psi, and still more typically at least about 30,000 psi, for a period of time to remove residual porosity left behind by the removal of the binder 137. The period of time is typically about 10 minutes, but can be longer or shorter. This residual porosity left behind by binder burn-out can result in porosity in the sintered dielectric layers and/or excessive grain growth into the voids, both of which are detrimental to energy storage.

After the CIP process 172, the MLC's 100 are place on refractory (typically alumina) setters and sintered 173 in an oxidizing atmosphere in a controlled atmosphere furnace to a temperature of from about 800 to about 950 degrees Celsius, typically from about 850 to about 900 degrees Celsius, for a period of up to about 12 hours. These conditions result in high sintered density of the titanium dioxide with a grain size less than about 500 nm, and typically between about 200 and about 300 nm. Optionally, the fired parts 100 can be subjected to hot-isostatic pressing (HIP) 174 at for example 850° C. for 2 hours in oxygen/argon gas at 45,000 psi to remove any residual porosity from the dielectric layers 140. The dielectric layers 140 typically have a maximum porosity of about 1 percent (about 99 percent theoretically dense), more typically have a maximum porosity of about 0.5 percent (about 99.5 percent theoretically dense), and still more typically have a maximum porosity of about 0.1 percent (about 99.9 percent theoretically dense).

Finally, silver paste 175 is applied to the ends of the capacitors 100 to make electrical contact with the internal electrodes 155. The paste 175 is fired 177 at about 700 degrees Celsius in air to bond the silver paste 175 to the internal electrodes 155 and to the ceramic 140.

EXAMPLES

Example 1 (ET694-04, MO-0964)

Titanium dioxide powder 120 was used that had an average particle size of 40 nm and greater than 99.9 percent purity. The titania powder 120 was a mixture of 80% anatase and 20% rutile and had a surface area of 38 m$^2$/g. 1000 g of titanium oxide powder 120 and 1.58 g vanadium isopropoxide (0.05 atomic percent V) 125 were added to a binder solution 137 of 107 g of polyvinyl butyral and 107 g of dioctyl phthalate plasticizer in 950 cc of acetone and 950 cc of ethanol to yield a slurry 135 and milled for 15 hours in a polypropylene jar with zirconia media. Next, 50 g of polyethylene glycol release agent was then added and mixed for 1 hour. Tape 140 with a thickness of 20 μm after firing was cast on a steel belt, dried and removed.

A gold electrode paste 155 was prepared by roll-milling a mixture of 68.2 wt. % gold powder, 4.0% titanium dioxide powder, 0.4% phosphate ester dispersant, and 26.4% of organic vehicle made from ethyl cellulose dissolved in a mixture if mineral spirits and ethyl hexanol. The gold powder had an average particle size of about 1 μm. The tape 140 and electrode paste 155 were used to construct multilayer capacitors 100 with two internal electrodes 155 using the wet-stack method described above. The "green" capacitors 100 had outside dimensions of about 1 cm.×1 cm.×0.5 cm. The organic binders 137 were removed by heating at 0.3 degrees Celsius per minute to 350 degrees Celsius in air with a hold for 0.5 hours and then the capacitors 100 were subjected to cold isostatic pressing at 30,000 psi for 10 minutes. Sintering was accomplished by heating the capacitors 100 in an oxygen atmosphere to a temperature of 950 degrees Celsius. The ramp rate was 4 degrees Celsius per minute during heating and 1 degree Celsius per minute on cooling, after a 2 hour soak at temperature. Silver paste 175 was applied to the ends of the capacitors 100, which were then fired at 700 degrees Celsius in air to make external contact to the internal electrodes 155.

Average grain size of the sintered dielectric 140 was about 350 nm. Average capacitance (10 pieces) was 1.18 nF with a dissipation factor at 1 kHz of 0.01%. Nine of ten (90%) parts had a breakdown voltage of at least 5200 V or 260 V/μm. The calculated energy storage ($\frac{1}{2} \epsilon_0 k E^2$) of the single active dielectric layer was 34.4 J/cc assuming a dielectric constant of 115, a significant increase over the prior art for a ceramic dielectric.

Example 2

Ceramic titania tape 140 and gold electrode paste 155 similar to those described in Example 1 were used to make chip capacitors 180 with 8 internal capacitors 100 connected in series, each with 20 active layers 140, 155. These builds 180 were baked-out and fired similar to the capacitors 100 in Example 1 but were subjected to additional hot-isostatic pressing (HIP) in an 80/20 argon/oxygen atmosphere at 900 degrees Celsius with 45,000 psi pressure applied. After firing the builds 180 were approximately 4 cm.×1.5 cm.×0.7 cm in size. Average grain size was about 350 nm. After terminations 175 were applied, 7 chip capacitors were stacked together. Capacitance of the stack was 12.2 nF with a dissipation factor of less than about 0.1%. The capacitor stack survived repeated pulse voltage testing at 10,000 volts.

Example 3

The titanium dioxide powder 120 described in Example 1 was used to make tape 140 by preparing a slurry 135 of 500 g of titanium oxide powder 120 with 5.0 g of PVB binder 138 to which was added 450 g of acetone 137 and 450 g of ethanol 137. The titanium dioxide slurry 135 was doped with manganese 125 by adding 0.5 g of manganese carbonate (0.07 at. % Mn) to the slurry 135, which was milled for 48 hours in a polypropylene jar with zirconia media. A binder mix of 59.0 g of PVB and 43.0 g of dioctyl phthalate (DOP) 138 with additional solvent 137 was then added and milling continued for a further 5 hours. Single layer capacitors 100 were made using gold paste 155 as described in Example 1. The green chips 100 were baked-out at 350 degrees Celsius and were then cold isostatically pressed (CIP'ed) at 40,000 psi before being fired in oxygen at 840 degrees Celsius for 6 hours. The fired thickness of the active layer 140 was 16 µm and grain size was between about 200 and about 300 nm. Average capacitance was 1.23 nF with a dissipation factor of 0.02%. Average breakdown voltage was 4,855 V or 303V/µm (5 pieces) with a maximum of 5960 V (373 V/µm). Calculated energy storage for the average breakdown voltage was 47 J/cc.

Example 4

Tape 140 was made as in Example 1 above (V doping) but the electrode paste 155 contained Pd metal instead of Au. Single layer green capacitors 100 were made and baked out as in Example 1, but the baked out samples were CIP'ed at 60,000 psi before being fired in oxygen at 900 degrees Celsius for 2 hours. The resultant capacitors 100 showed no sign of delamination because Pd is known to oxidize and expand 44.5% in volume when heated in oxygen at temperatures up to 850 degrees Celsius. Dielectric layer thickness was 20 µm and grain size was about 300 nm. Capacitance was 1.25 nF with a dissipation factor of 0.03%. All of the parts tested survived an applied voltage of 6000 V (300 V/µm), giving a calculated energy storage value greater than 46 J/cc.

Example 5

Single layer parts 100 were made and processed as in Example 4 except that the titanium dioxide 120 was doped with 0.07 atomic percent Mn 125. Results were very similar to those obtained in Example 4. Capacitance was 1.27 nF with a dissipation factor of 0.11%. All of the parts tested survived an applied voltage of 6000 V (300 V/µm), giving a calculated energy storage of greater than 46 J/cc.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:
1. A multilayer ceramic capacitor, comprising:
a plurality of electrode layers; and
a plurality of substantially titanium dioxide dielectric layers;
wherein each respective substantially titanium dioxide dielectric layer is positioned between two respective electrode layers;
wherein each respective substantially titanium dioxide dielectric layer has an average grain size of between about 200 and about 300 nanometers; and
wherein each respective substantially titanium dioxide dielectric layer has maximum grain size about 400 nanometers.

2. The multilayer ceramic capacitor of claim 1 wherein each respective substantially titanium dioxide dielectric layer has a maximum porosity of about 1 percent.

3. The multilayer ceramic capacitor of claim 1 wherein each respective substantially titanium dioxide dielectric layer has a maximum porosity of about 0.5 percent.

4. The multilayer ceramic capacitor of claim 1 wherein each respective substantially titanium dioxide dielectric layer has a maximum porosity of about 0.1 percent.

5. The multilayer ceramic capacitor of claim 1 wherein the multilayer ceramic capacitor has an energy storage capacity of at least about 5 Joules per cubic centimeter.

6. The multilayer ceramic capacitor of claim 1 wherein the multilayer ceramic capacitor has an energy storage capacity of at least about 10 Joules per cubic centimeter.

7. The multilayer ceramic capacitor of claim 1 wherein the multilayer ceramic capacitor has an energy storage capacity of at least about 20 Joules per cubic centimeter.

8. The multilayer ceramic capacitor of claim 1 wherein the multilayer ceramic capacitor has an energy storage capacity of at least about 50 Joules per cubic centimeter.

9. The multilayer ceramic capacitor of claim 1 wherein each respective substantially titanium dioxide dielectric layer further includes at least one dopant selected from the group including P, V, Nb, Ta, Mo, W, and combinations thereof; and wherein the included dopant is present in amounts of less than about 1 atomic percent.

10. The multilayer ceramic capacitor of claim 1 wherein each respective substantially titanium dioxide dielectric layer further includes at least one dopant selected from the group including P, V, Nb, Ta, Mo, W, and combinations thereof; and wherein the included dopant is present in amounts of less than about 0.1 atomic percent.

11. The multilayer ceramic capacitor of claim 1 wherein each respective substantially titanium dioxide dielectric layer further includes at least one dopant selected from the group including P, V, Nb, Ta, Mo, W, and combinations thereof; and wherein the included dopant is present in amounts of less than about 0.01 atomic percent.

12. The multilayer ceramic capacitor of claim 1 wherein each respective substantially titanium dioxide dielectric layer further includes at least one dopant selected from the group including Co, Ni, Fe, Mn, Mg, and combinations thereof; and wherein the included dopant is present in amounts of less than about 1 atomic percent.

13. The multilayer ceramic capacitor of claim 1 wherein each respective substantially titanium dioxide dielectric layer further includes at least one dopant selected from the group including Co, Ni, Fe, Mn, Mg, and combinations thereof; and wherein the included dopant is present in amounts of less than about 0.1 atomic percent.

14. The multilayer ceramic capacitor of claim 1 wherein each respective substantially titanium dioxide dielectric layer further includes at least one dopant selected from the group including Co, Ni, Fe, Mn, Mg, and combinations thereof; and wherein the included dopant is present in amounts of less than about 0.01 atomic percent.

15. The multilayer ceramic capacitor of claim 1 wherein multilayer ceramic capacitor has a breakdown voltage in excess of about 3000 kV per centimeter.

16. The multilayer ceramic capacitor of claim 1 wherein each respective substantially titanium dioxide dielectric layer has an average grain size of less than about 300 nanometers and wherein each respective substantially titanium dioxide dielectric layer has a maximum grain size of less than about 400 nanometers.

17. The multilayer ceramic capacitor of claim 1 wherein the multilayer ceramic capacitor has an energy storage capacity of at least about 40 Joules per cubic centimeter.

18. A multilayer ceramic capacitor, comprising:
a plurality of electrode layers; and
a plurality of titanium dioxide dielectric layers; and
a first metallic contact in electric communication with alternating respective electrode layers;
a second metallic contact in electric communication with alternating respective electrode layers;
wherein each respective substantially titanium dioxide dielectric layer is positioned between two respective electrode layers;
wherein the first metallic contact is electrically insulated from the second metallic contact;
wherein each respective substantially titanium dioxide dielectric layer has an average grain size of less than about 300 nanometers;
wherein each respective substantially titanium dioxide dielectric layer has maximum grain size of about 400 nanometers; and
wherein each respective substantially titanium dioxide dielectric layer has a maximum porosity of 0.1 percent.

19. The multilayer ceramic capacitor of claim 18 wherein the multilayer ceramic capacitor has an energy storage capacity of between about 10 Joules per cubic centimeter and 50 Joules per cubic centimeter.

20. A multilayer ceramic capacitor of claim 18 and further comprising at least one dopant selected from the group including P, V, Nb, Ta, Mo, W, and combinations thereof; and wherein the included dopant is homogenously distributed throughout each respective titanium dioxide layer in amounts between about 0.01 atomic percent and 1 atomic percent.

21. A multilayer ceramic capacitor of claim 18 wherein further comprising at least one dopant selected from the group including Co, Ni, Fe, Mn, Mg, and combinations thereof; and wherein the included dopant is present in amounts between about 0.01 atomic percent and 1 atomic percent.

* * * * *